(12) United States Patent
Izawa et al.

(10) Patent No.: US 9,727,097 B2
(45) Date of Patent: Aug. 8, 2017

(54) LENGTH-ADJUSTABLE STORAGE DEVICE

(71) Applicant: KABUSHIKI KAISHA TOSHIBA, Tokyo (JP)

(72) Inventors: Katsumi Izawa, Yokohama Kanagawa (JP); Hiroki Nakata, Yokohama Kanagawa (JP); Manabu Matsumoto, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/062,447

(22) Filed: Mar. 7, 2016

(65) Prior Publication Data

US 2017/0131748 A1 May 11, 2017

Related U.S. Application Data

(60) Provisional application No. 62/252,139, filed on Nov. 6, 2015.

(51) Int. Cl.
*G06F 1/16* (2006.01)
*G06F 1/18* (2006.01)

(52) U.S. Cl.
CPC .................... *G06F 1/183* (2013.01)

(58) Field of Classification Search
CPC ................ G06F 1/183; G06F 1/186
See application file for complete search history.

(56) References Cited

U.S. PATENT DOCUMENTS

| 5,706,173 | A | * | 1/1998 | Carney | G06F 1/184 312/223.2 |
| 5,909,359 | A | * | 6/1999 | Summers | G06F 1/184 174/250 |
| 6,362,978 | B1 | * | 3/2002 | Boe | G06F 1/184 248/65 |
| 8,028,404 | B2 | | 10/2011 | Hoang | |
| 2007/0109758 | A1 | * | 5/2007 | Han | H05K 3/282 361/760 |
| 2015/0355686 | A1 | * | 12/2015 | Heyd | G06F 1/187 361/679.31 |

FOREIGN PATENT DOCUMENTS

| JP | 2004327588 A | 11/2004 |
| JP | 2006186172 A | 7/2006 |

* cited by examiner

*Primary Examiner* — Anthony Q Edwards
(74) *Attorney, Agent, or Firm* — Patterson & Sheridan, LLP

(57) ABSTRACT

A storage device includes a base board and a memory chip package. The base board includes, on a first edge, a connector that is connectable to a host device and through which the storage device communicates with the host device, on a second edge that is opposite to the first edge, a first engaging portion by which the base board is fixable to the host device, and in an intermediate portion that is located between the first edge and the second edge, a second engaging portion by which the base board is fixable to the host device when an end portion of the base board between the second edge and the intermediate portion is removed. The memory chip package is disposed on a surface of the base board and between the first edge and the intermediate portion.

20 Claims, 13 Drawing Sheets

LENGTH-ADJUSTABLE STORAGE DEVICE

CROSS-REFERENCE TO RELATED APPLICATION

This application is based upon and claims the benefit of priority from U.S. Provisional Patent Application No. 62/252,139, filed on Nov. 6, 2015, the entire contents of which are incorporated herein by reference.

FIELD

Embodiments described herein relate generally to a storage device, in particular, a length-adjustable storage device.

BACKGROUND

A storage device of one type includes a semiconductor memory component.

DETAILED DESCRIPTION

According to an embodiment, a storage device includes a base board and a memory chip package. The base board includes, on a first edge, a connector that is connectable to a host device and through which the storage device communicates with the host device, on a second edge that is opposite to the first edge, a first engaging portion by which the base board is fixable to the host device, and in an intermediate portion that is located between the first edge and the second edge, a second engaging portion by which the base board is fixable to the host device when an end portion of the base board between the second edge and the intermediate portion is removed. The memory chip package is disposed on a surface of the base board and between the first edge and the intermediate portion.

A storage device and a board according to embodiments will be described below, with reference to the drawings. In the description below, elements having the same or similar functions are described with the same reference symbol, and duplicate descriptions thereof might be omitted.

First Embodiment

Figure 1:
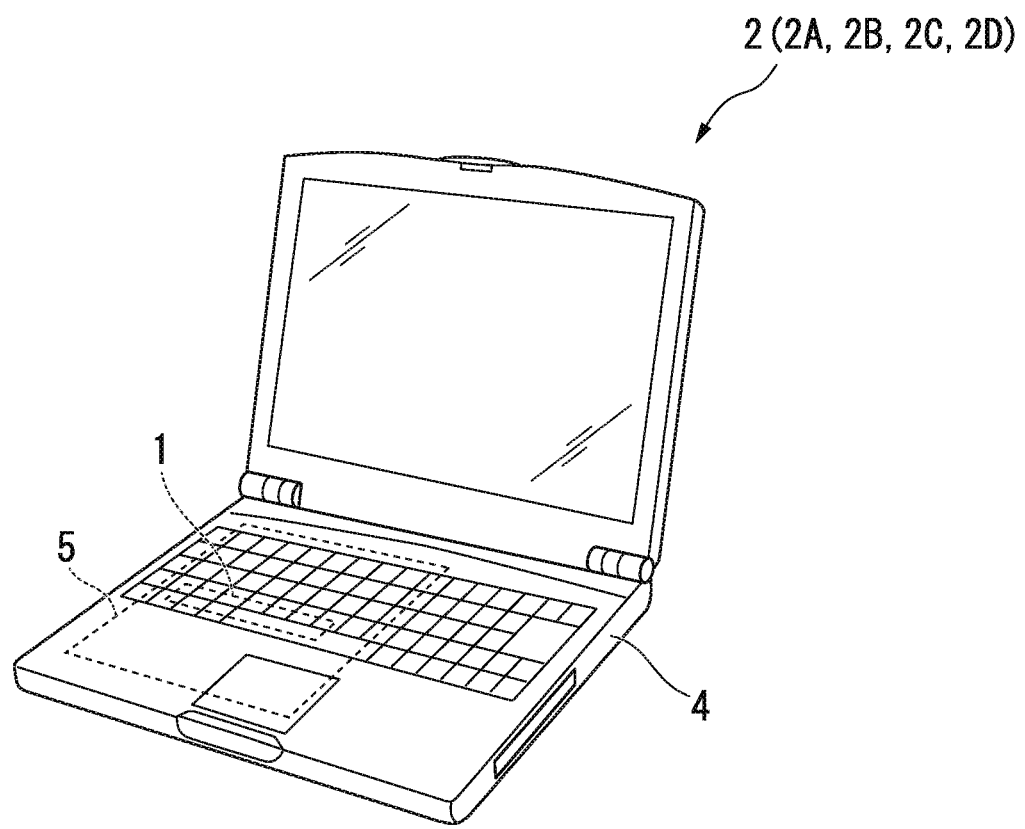
FIG. 1 is a perspective view of an electronic apparatus to which a storage device according to a first embodiment is attached.

A first embodiment will be described below with reference to FIG. 1 to FIG. 6. FIG. 1 shows an example of an electronic apparatus 2 to which a storage device 1 according to the present embodiment is attached.

The electronic apparatus 2 is a portable computer, for example. However, the electronic apparatus to which the storage device 1 is attached is not limited thereto. The electronic apparatus to which the storage device 1 is attached may be one of various electronic apparatuses including a tablet terminal, a smart phone, a server, a television receiver, a game console, etc. The electronic apparatus 2 is an example of an "external apparatus" and a "host device". The "external apparatus" in the present embodiment generally refers to an apparatus located outside of a storage device (e.g., the storage device 1). That is, the "external apparatus" in the present embodiment may be an apparatus which accommodates a storage device (e.g., the storage device 1) therein.

As shown in FIG. 1, the electronic apparatus 2 includes a case 4 and a circuit board 5 (e.g., mainboard) in the case 4. The circuit board 5 has a connector 6 and a fixation structure 7 (refer to FIG. 2). The storage device 1 is attached to the connector 6. The fixation structure 7 fixes the storage device 1. The storage device 1 is electrically connected to the circuit board 5 by being attached to the connector 6. The storage device 1 is prevented from being detached from the connector 6 by being fixed by the fixation structure 7. The details of the fixation structure 7 will be described below.

Next, the details of the storage device 1 according to the present embodiment will be described. The storage device 1 according to the present embodiment is a semiconductor memory device. For example, the storage device is a solid state drive (SSD).

Figure 2:
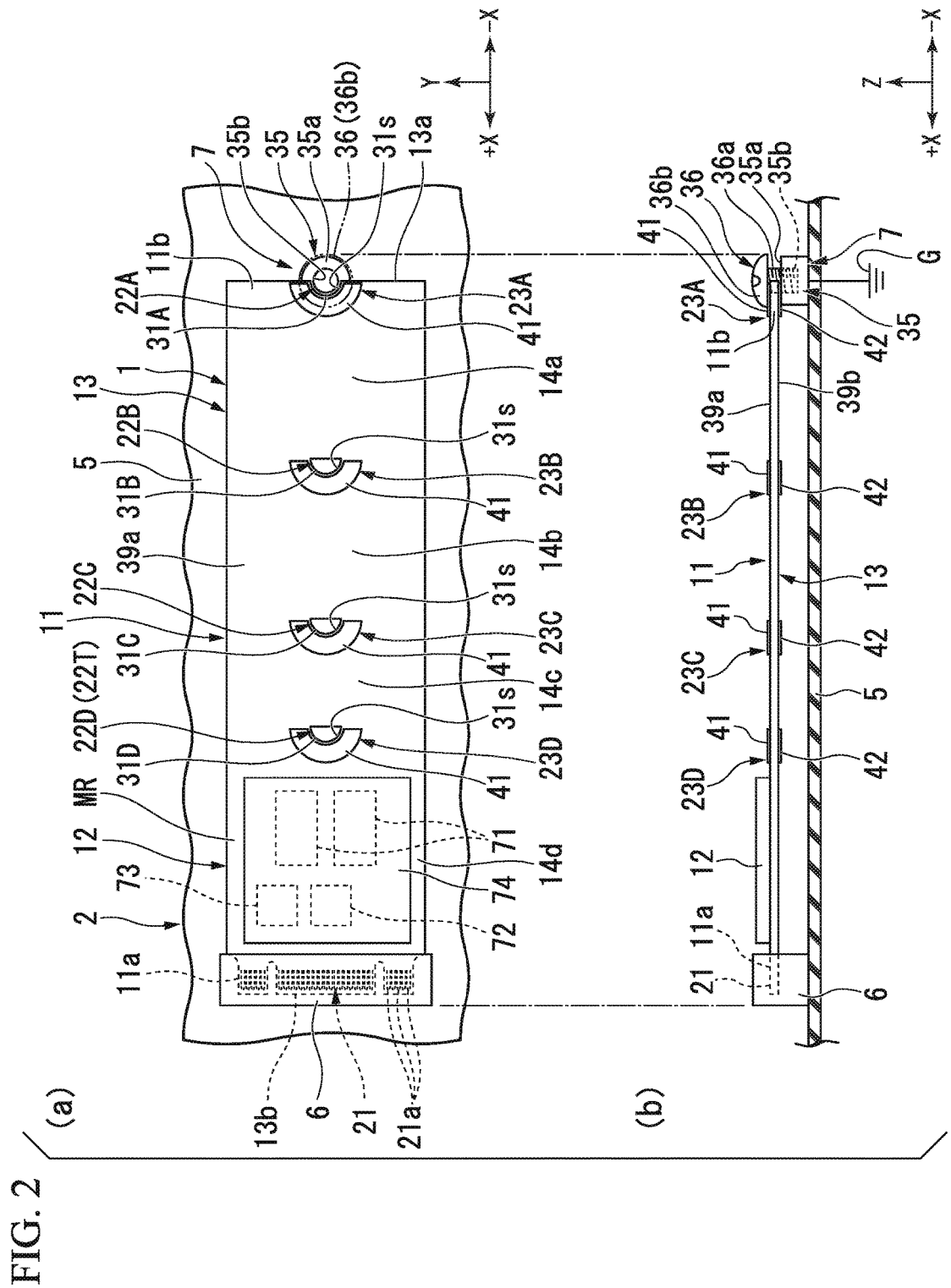
FIG. 2 illustrates an inner structure of the electronic apparatus in which the storage device according to the first embodiment is mounted.
Figure 3:
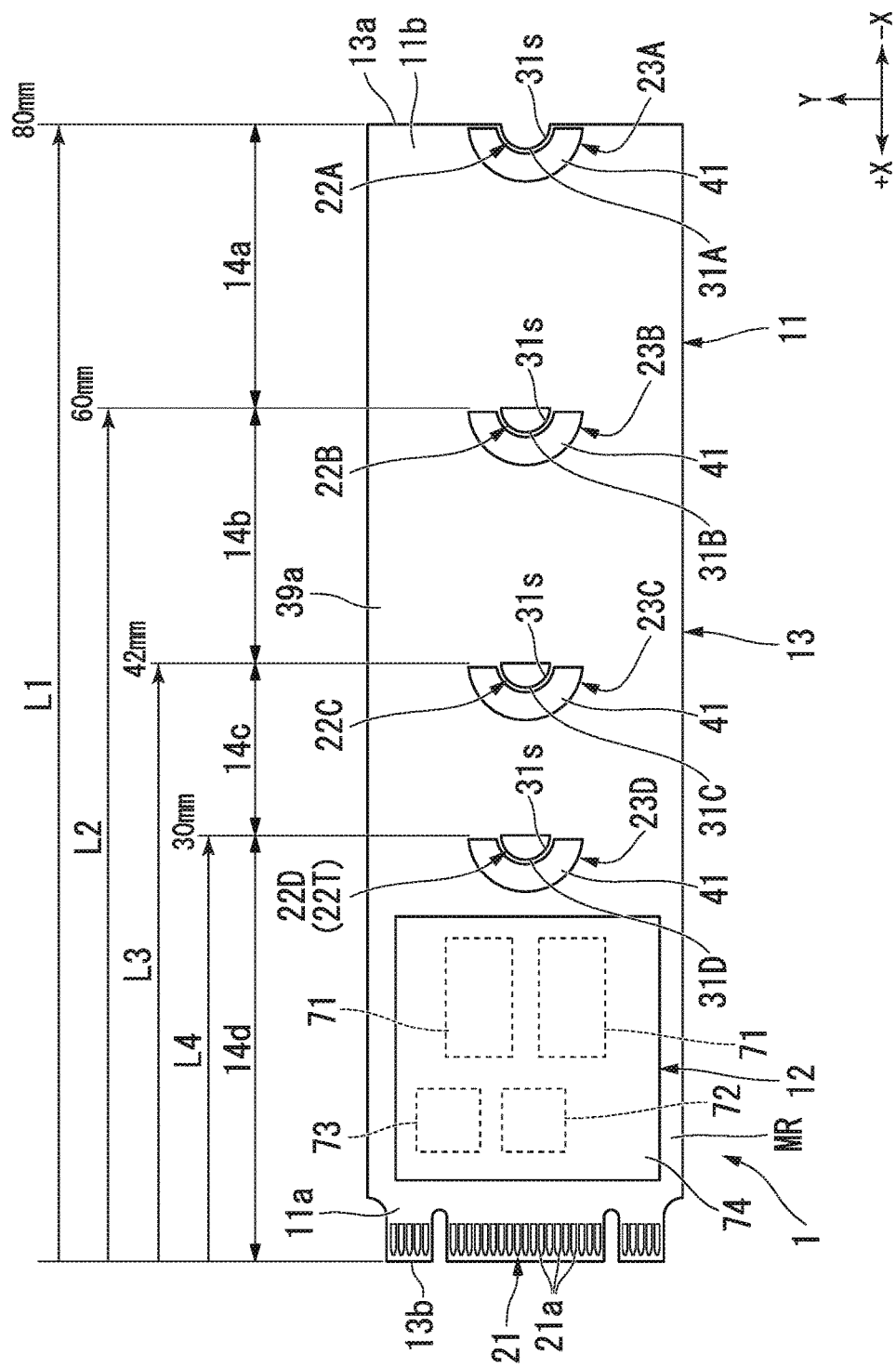
FIG. 3 is a plan view of the storage device according to the first embodiment.

FIG. 2 shows the storage device 1 attached to the connector 6 of the electronic apparatus 2. FIG. 3 shows the storage device 1 detached from the connector 6.

Here, +X direction, −X direction, Y direction, and Z direction will be defined. +X direction, −X direction, and Y direction are directions extending along a surface of a board (base board) 11 of the storage device 1. +X direction is a direction in which the storage device 1 (e.g., an attaching direction of a terminal portion 21, the terminal portion 21 being described below) is moved towards the connector 6 to be attached thereto. +X direction is a longitudinal direction of the board 11, for example. +X direction is an example of a "second direction." −X direction is an opposite direction of +X direction. Y direction is a direction crossing (e.g., perpendicular to)+X direction. Y direction is a width direction of the board 11, for example. Y direction is an example of a "first direction." Z direction is a direction crossing (e.g., perpendicular to)+X direction and Y direction. Z direction is a thickness direction of the board 11, for example.

As shown in FIG. 2 and FIG. 3, the storage device 1 according to the present embodiment includes the board 11 and a memory component 12.

The board (e.g., a wiring board, a printed board, or circuit board) 11 includes an insulating member 13 and conductive patterns. The insulating member 13 is made of an insulating material. The insulating member 13 is an example of a main body of the board 11. The conductive patterns (e.g., wiring patterns) are provided in inner layers and outer layers of the insulating member 13. The insulating member 13 has a first side 13a and a second side 13b, which is opposite to the first side 13a. The first side 13a and the second side 13a are distant from each other in X direction. The first side 13a of the insulating member 13 is a first side of the board 11. The second side 13b of the insulating member 13 is a second side of the board 11. Therefore, it may be possible to say that the board 11 includes a first side 13a and a second side 13b.

The details of the inner structure (e.g., lamination structure) of the board 11 will be described below.

The board 11 includes a first end portion 11a and a second end portion 11b. The first end portion 11a is an end portion of the board 11 in +X direction. The second end portion 11b is an end portion of the board 11 in −X direction. The second end portion 11b is positioned opposite to the first end portion 11a Here, an "end portion" in the present disclosure includes an end surface and an end region which is near (e.g., in a vicinity of) the end surface.

Here, the storage device 1 according to the present embodiment is a storage device complying with a standard defined by a standardization organization. For example, the storage device 1 of the present embodiment is a storage device complying with the M.2 standard. That is, an outer shape of the board 11 and the fixation structure 7, etc. comply with the M.2 standard. The details of the M.2 standard are specified by one or more standardization organizations, such as PCI SIG and SATA-IO. However, the standard with which the storage device 1 complies is not limited to the M.2 standard. The storage device 1 may comply with the mPCIe standard or another standard. In the following, the standard employed by the storage device 1 (e.g., the standard with which the storage device 1 complies) will be called a "predetermined standard".

In the present embodiment, the predetermined standard defines a plurality of standard lengths (e.g., standard sizes) as lengths of the board 11 in −X direction (e.g., length from the first end portion 11a towards the second end portion 11b). For example, the M.2 standard defines standard lengths of 30 mm, 42 mm, 60 mm, 80 mm, and 110 mm as lengths of the board 11 in −X direction.

The storage device 1 of the present embodiment improves a flexibility of product application, to the plurality of standard lengths. That is, in the present embodiment, after the storage device 1 is produced (e.g., after the storage device 1 is purchased) in a state where the outer shape of the board 11 has a size including (e.g., covering) two or more standard lengths, the board 11 may be cut at an arbitrary position (e.g., a desired position). That is, a user (purchaser) of the storage device 1 can select a desired standard length chosen from the two or more standard lengths. Hereinafter, the details of the storage device 1 to achieve such a practice will be described.

Figure 5:
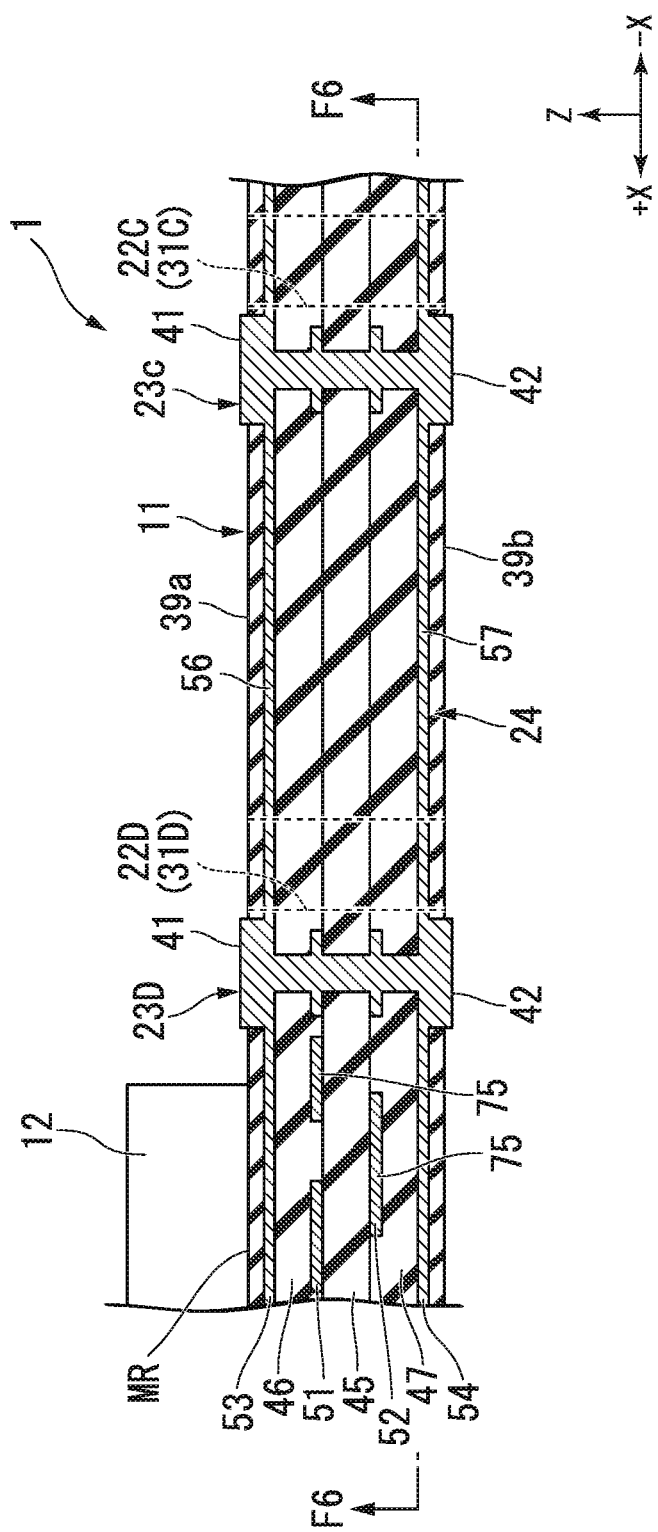
FIG. 5 is a cross-sectional view of the storage device according to the first embodiment.

As shown in FIG. 2 and FIG. 3, the board 11 includes the terminal portion 21, first to fourth receivers (engaging portions) 22A, 22B, 22C, and 22D, first to fourth conductive patterns 23A. 23B, 23C, and 23D, and a ground pattern 24 (refer to FIG. 5).

The terminal portion 21 is provided in the first end portion 11a of the board 11. The terminal portion 21 is an interface configured to be connected to the connector 6 of the electronic apparatus 2. The terminal portion 21 includes a plurality of terminals (e.g., metal terminals) 21a exposed on a surface (e.g., at least on a first surface 39a described below) of the board 11 and are connectable to the connector 6. Each of the plurality of terminals 21a is on the second side 13b of the board 11 or a position closer to the second side 13b than a center of the board 11. Here, the "center" of the board 11 means a center of the board 11 in X direction. The plurality of terminals 21a in the present embodiment corresponds to the M.2 standard, for example. The "terminal portion" in the present disclosure is a group of the plurality of terminals (e.g., terminal 21a) (or a region in which a plurality of terminals is formed). In other words, the "terminal portion" may mean an insert portion (e.g., connecting portion) configured to be inserted into an inside of a connector (e.g., connector 6).

The first to fourth receivers 22A, 22B, 22C, and 22D include substantially the same shape as one another. First, the first receiver 22A, and the fixation structure 7 of the electronic apparatus 2 fixing the first receiver 22A will be described in detail. A "receiver" in the present disclosure means a portion configured to face a fastener (e.g., fastener 36), which is a component different from the board 11. That is, a "receiver" in the present disclosure may mean a portion of the board 11 configured to be supported by the fastener (e.g., a portion configured to be in touch with the fastener). "A receiver configured to receive a fastener" in the present disclosure means that a receiver is configured to receive a fastener to restrain the position of the storage device (e.g., the storage device 1) from being displaced. For example, "a receiver configured to receive a fastener" means that a receiver has a shape corresponding to a shape (e.g., outer shape) of the fastener. The "receiver" is not limited to a specific structure or a specific shape if the receiver has a shape that enables a fastener to restrain the position of the storage device.

As shown in FIG. 3, the first receiver 22A is provided in the second end portion 11b of the board 11. That is, the first receiver 22A is formed in an end portion of the board 11, which is positioned opposite to the terminal portion 21. The first receiver 22A is on the first side 13a of the board 11 or a position closer to the first side 13a than the center of the board 11. Here, the "center" of the board 11 means the center of the board 11 in X direction. The first receiver 22A is configured to receive the fastener 36 (refer to FIG. 2) which fixes the board 11 to the electronic apparatus 2. The first receiver 22A of the present embodiment includes a first recess 31A adjacent to the second end portion 11b of the board 11 (e.g., adjacent to the first side 13a). The first recess 31A is an example of an "insertion portion" into which the fastener 36 is insertable in the thickness direction of the board 11. The "insertion portion" in the present disclosure may be a hole or a recess which penetrates the board in the thickness direction of a board (e.g., board 11). The "recess" in the present disclosure means that space is formed in an end portion of the board 11 as a result of the recess. From another viewpoint, the first receiver 22A is a hole or a recess to receive the fastener 36.

The fastener 36 includes an axial portion 36a (e.g., threaded body), which includes threads, for example (refer to FIG. 2). The first recess 31A is formed in the shape of an arc along an outer shape of the axial portion 36a of the fastener 36. For example, the first recess 31A has a surface 31s which is in the shape of an arc along the outer shape of the axial portion 36a of the fastener 36. The first recess 31A has a shape of a semicircle recessed in +X direction, for example. The "recess" in the present disclosure means a recess depressed in +X direction, for example. The "recess" is not limited a recess formed in the shape of an arc.

On the other hand, as shown in FIG. 2, the fixation structure 7 of the electronic apparatus 2 includes a supporter 35 as well as the fastener 36. The fixation structure 7 of the present embodiment is disposed at a location corresponding to (e.g., complying with) a first standard length L1.

The supporter (e.g., an installation portion, or a projection) 35 is a cylindrical boss provided on the circuit board 5 (or case 4), for example. The supporter 35 is projected towards the storage device 1 from the circuit board 5 (or the case 4). The supporter 35 has a support surface (e.g., a top surface, or a mounting surface) 35a and an attachment hole (e.g., engaging hole) 35b. The support surface 35a is in contact with the board 11 of the storage device 1 and supports the board 11. The attachment hole 35b is formed in the support surface 35a. The attachment hole 35b is a screw hole having threads, for example. The attachment hole 35b is located in a position corresponding to the surface of the first recess 31A. The "supporter" in the present disclosure means a member located to be in contact with a storage device (e.g., storage device 1), and configured to support the storage device in a direction from the storage device toward the supporter (e.g., configured to restrict the position of storage device). The "supporter" may be a structure (or part of a structure) which is in contact with the storage device, and is not limited to one which has a specific shape etc. The supporter may not be limited to a projection. The supporter may be a plane surface of the case (e.g., case 4).

The fastener (i.e., fixing member) 36 is a screw member engageable with the attachment hole 35b, for example. The fastener 36 includes the axial portion 36a and a head 36b.

As shown in FIG. 2, the first recess 31A of the first receiver 22A allows the axial portion 36a to pass. The axial portions 36a faces the surface 31s of the first recess 31A in +X direction and in Y direction, for example. The positions of the board 11 in +X direction and in Y direction become settled by the axial portion 36a being coupled with the first recess 31A. A circumferential surface of the axial portion 36a includes the threads. The axial portion 36a is an example of a "screw portion." The axial portion 36a engages with the attachment hole 35b of the supporter 35, and is fixed to the supporter 35. An "axial portion" in the present disclosure is a portion of the fastener 36, which is smaller than an outer diameter of a head (e.g., an outer diameter of the head 36b).

The head 36b is in contact with the board 11 of the storage device 1 on a side facing the support surface 35a of the supporter 35. The head 36b supports the board 11. In other words, the board 11 is disposed between the support surface 35a of the supporter 35 and the head 36b of the fastener 36. Thereby, the position of the board 11 in Z direction becomes settled. The "head" in the present disclosure means that a portion faces (e.g., suppress) a board (e.g., board 11) in the thickness direction of the board.

In the manner with the above-described configuration, the storage device 1 is fixed to the electronic apparatus 2.

Here, as shown in FIG. 3, the storage device 1 of the present embodiment is adjustable to each of first to fourth standard lengths (e.g., first to fourth standard sizes) L1, L2, L3, and L4 as the plurality of standard lengths specified by the above-described predetermined standard. The first to fourth standard lengths are the lengths of the board 11 in +X direction, for example. The first standard length L1 is 80 mm, for example. The second standard length L2 is 60 mm, for example. The third standard length L3 is 42 mm, for example. The fourth standard length L4 is 30 mm, for example. The board 11 has the first standard length L1 which is the longest length among the first to fourth standard lengths L1, L2, L3, and L4 at the time the product is produced (e.g., at the time the product is released in a market). Thereby, the board 11 is adjustable to each of the first to fourth standard lengths L1. L2, L3, and L4.

As shown in FIG. 3, the insulating member 13 includes first to fourth regions 14a, 14b, 14c, and 14d.

The first region 14a has the first side 13a. The first region 14a is defined by two virtual lines which are distant from the second side 13b by the first and second standard lengths L and L2, respectively.

The second region 14b is next to the first region 14a. The second region 14b is defined by two virtual lines which are distant from the second side 13b by the second and third standard lengths L2 and L3, respectively. From another viewpoint, a boundary between the first region 14a and the second region 14b is distant from the second side 13b by the second standard length L2.

The third region 14c is next to the second region 14b. The third region 14b is positioned opposite to the first region 14a with respect to the second region 14b. The third region 14c is defined by two virtual lines which are distant from the second side 13b by the third and fourth standard lengths L3 and L4, respectively. From another viewpoint, a boundary between the second region 14b and the third region 14c is distant from the second side 13b by the third standard length L3.

The fourth region 14d is next to the third region 14c. The fourth region 14d is positioned opposite to the second region 14b with respect to the third region 14c. From another viewpoint, a boundary between the third region 14c and the fourth region 14d is distant from the second side 13b by the third standard length L3.

As shown in FIG. 3, the first receiver 22A is in the first region 14a. The first receiver 22A is closer to the first side 13a than a center of the first region 14a. Here, the "center" of the first region 14a is a center of the first region 14a in X direction. The first receiver 22A is provided in a position corresponding to the first standard length L1. "A first receiver is provided in a position corresponding to a first standard length" means that the terminal portion 21 and the first receiver 22A of the storage device 1 are fixable (e.g., supportable or engageable) by the connector 6 and the fixation structure 7 of the electronic apparatus 2 when the connector 6 and the fixation structure 7 of the electronic apparatus 2 are provided to comply with the first standard length L1 specified by the predetermined standard. From another viewpoint, "a first receiver is provided in a position corresponding to a first standard length" may mean that the first receiver 22A is positioned on or in a vicinity of a virtual line (e.g., base line) which extends in Y direction when the virtual line is distant from the first end portion 11b of the board 11 (e.g., from the second side 13b of the board 11) by the first standard length L1. Furthermore, from another viewpoint, "a first receiver is provided in a position corresponding to a first standard length" may mean that the first receiver 22A is positioned in the end 11b of the board 11 when the board 11 has the first standard length L1 and the end 11b is positioned opposite to the terminal portion 21 in the board 11. Those definitions of the "first receiver 22A" are applicable to each of the second to fourth receivers 22B, 22C, and 22D. That is, in the above descriptions, the description of the "first receiver 22A" may be applicable to each of the second to fourth receivers 22B, 22C, and 22D, and the description of the "first standard length L1" may be applicable to each of the second to fourth standard lengths L2, L3, and L4.

As shown in FIG. 3, the second receiver 22B is positioned between the terminal portion 21 and the first receiver 22A. The second receiver 22B is in the second region 14b. The second receiver 22B is closer to the first region 14a than a center of the second region 14b. Here, the "center" of the second region 14b is a center of the second region 14b in X direction. From another viewpoint, the second receiver 22B is between the terminal portion 21 (e.g., the terminal 21a) and a position that is distant from the second side 13b by the second standard length L2. The second receiver 22B is provided in a position corresponding to the second standard length L2. The second receiver 22B is provided for the fastener 36. The second receiver 22B is configured to receive the fastener 36 when the first region 14a is removed. For example, the second receiver 22B is configured to receive the fastener 36 when the board 11 is cut off along the line corresponding to the second standard length L2. In other words, when the board 11 is cut off along the line corresponding to the second standard length L2, the second receiver 22B is fixable (e.g., supportable or engageable) by the fixation structure 7 of the electronic apparatus 2, which would be disposed corresponding to (e.g., complying with) the second standard length L2.

In the present embodiment, the second receiver 22B is in a form of a hole or a recess to receive the fastener 36. For example, the second receiver 22B is a hole in a shape of a semicircle provided in a middle of the board 11, for example. The second receiver 22B includes substantially the same shape as the shape of the first receiver 22A when the board 11 is cut off along the line corresponding to the second standard length L2. For example, the second receiver 22B includes a second recess 31B which includes substantially the same shape as the shape of the first recess 31A when the board 11 is cut off. The second recess 31B is an example of the "insertion portion" into which the fastener 36 (refer to FIG. 2) is insertable in the thickness direction of the board 11. The second recess 31B is formed in the shape of an arc along the outer shape of the axial portion 36a of the fastener 36. For example, the second recess 31B has the surface 31s which would be in the shape of an arc along the outer shape of the axial portion 36a of the fastener 36. Here, "when a board is cut off along a line corresponding to a second standard length" may be replaced with "when a board is cut off along a line corresponding to a second receiver". "When a board is cut off along a line corresponding to a second receiver" in the present embodiment is not limited to a case where the board 11 is cut at a position adjacent to the second receiver 22B. "When a board is cut along a line corresponding to a second receiver" in the present disclosure includes a case where the board 11 is cut at a position in a vicinity of the second receiver 22B. The board 11 may be cut by a router cutter. However, the method of cutting the board 11 is not limited thereto.

Similarly, the third receiver 22C is positioned between the terminal portion 21 and the second receiver 22B. The third receiver 22C is in the third region 14c. The third receiver 22C is closer to the second region 14b than a center of the third region 14c. Here, the "center" of the third region 14c is a center of the third region 14c in +X direction. From another viewpoint, the third receiver 22C is between the terminal portion 21 (e.g., the terminal 21a) and a position that is distant from the second side 13b by the third standard length L3. The third receiver 22C is provided in a position corresponding to the third standard length L3. The third receiver 22C is provided for the fastener 36. The third receiver 22C is configured to receive the fastener 36 when the first and second regions 14a and 14b are removed. For example, the third receiver 22C is configured to receive the fastener 36 when the board 11 is cut off along a line corresponding to the third standard length L3. For example, the third receiver 22C is in a form of a hole or a recess to receive the fastener 36.

The fourth receiver 22D is positioned between the terminal portion 21 and the third receiver 22C. The fourth receiver 22D is in the fourth region 14d. The fourth receiver 22D is closer to the third region 14c than a center of the fourth region 14d. Here, the "center" of the fourth region 14d is a center of the fourth region 14d in +X direction. From another viewpoint, the fourth receiver 22D is between the terminal portion 21 (e.g., the terminal 21a) and a position that is distant from the second side 13b by the fourth standard length L4. The fourth receiver 22D is provided in a position corresponding to the fourth standard length L4. The fourth receiver 22D is provided for the fastener 36. The fourth receiver 22D is configured to receive the fastener 36 when the first, second, and third regions 14a 14b, and 14c are removed. For example, the third receiver 22C is configured to receive the fastener 36 when the board 11 is cut off along a line corresponding to the fourth standard length L4. For example, the fourth receiver 22D is in a form of a hole or a recess to receive the fastener 36.

The configuration of the third and fourth receivers 22C and 22D is substantially the same as the configuration of the second receiver 22B. Therefore, regarding the configuration of the third and fourth receivers 22C and 22D, the description of the second receiver 22B may be applicable to each of the third and fourth receivers 22C and 22D, the description of the second standard length L2 may applicable to each of the third and fourth standard lengths L3 and L4, and the description of the second recess 31B may be applicable to each of third and fourth recesses 31C and 31D.

Figure 4:
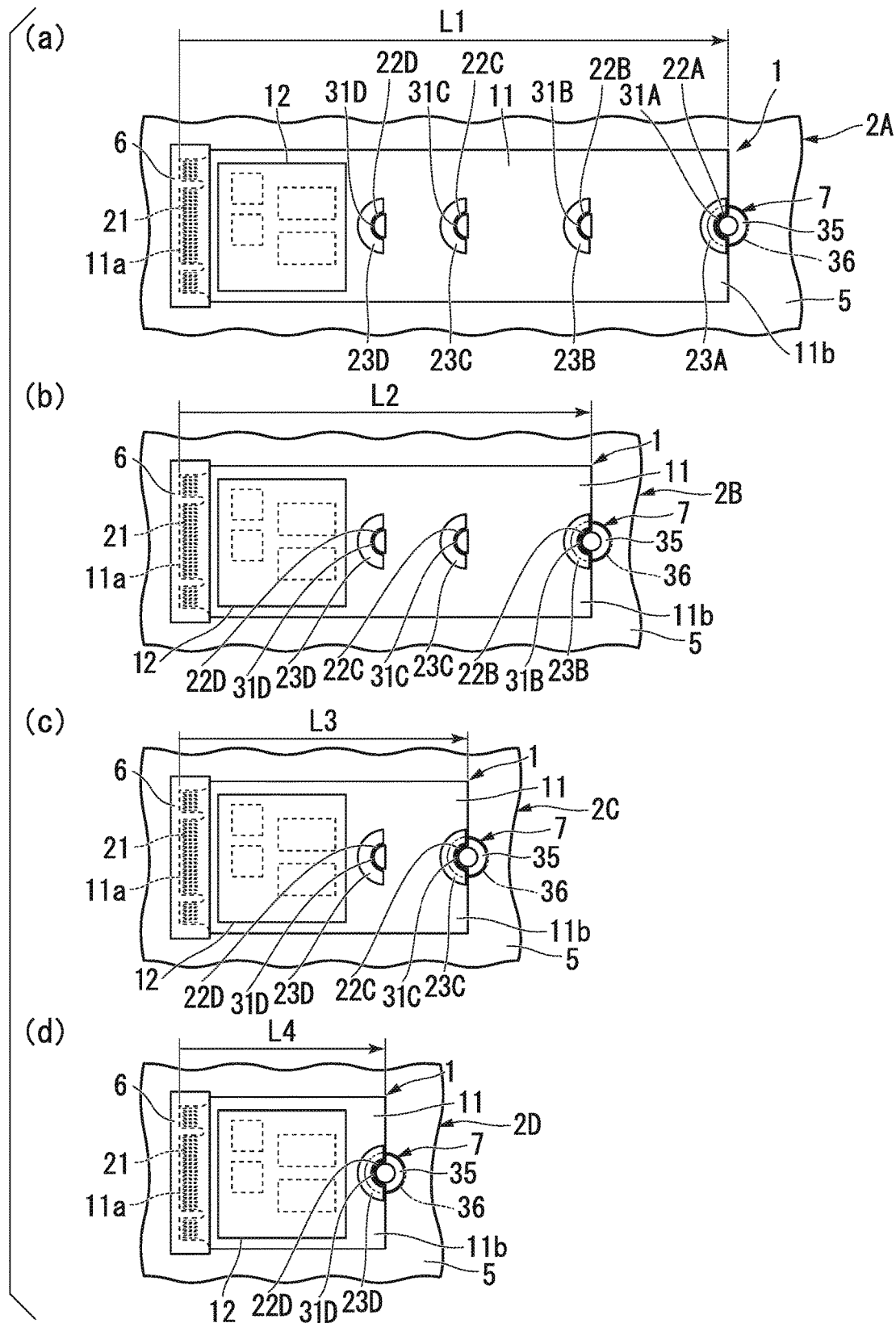
FIG. 4 is a plan view of a plurality of electronic apparatuses to each of which the memory storage according to the first embodiment is attached.

FIG. 4 shows a plural kinds of electronic apparatuses 2A, 2B, 2C, and 2D to which the storage device 1 is attached. Each of the electronic apparatuses 2A, 2B, and 2C and 2D is equivalent to the above-described electronic apparatus 2. That is, each of the electronic apparatuses 2A, 2B, 2C, and 2D has substantially the same structure as the structure of the electronic apparatus 2 described above except for the position of the fixation structure 7, for example.

(a) in FIG. 4 shows the electronic apparatus 2A to which the storage device having (e.g., complying with) the first standard length L1 is connected and fixed with the connector 6 and the fixation structure 7. The storage device 1 including the board 11 which has the first standard length L1 is attachable to the electronic apparatus 2A. The storage device 1 is fixed by the fastener 36 passing through the first recess 31A of the first receiver 22A (i.e., by the fastener 36 being attached to the first recess 31A). The second to fourth recesses (holes) 31B, 31C, and 31D are not fixed by the fastener 36 and remain as remnant engaging portions.

(b) in FIG. 4 shows the electronic apparatus 2B to which the storage device having the second standard length L2 is connected and fixed with the connector 6 and the fixation structure 7. The storage device 1 is attachable to the electronic apparatus 2B when the board 11 is cut to have the second standard length L2. The storage device 1 is fixed by the fastener 36 passing through the second recess 31B of the second receiver 22B (i.e., by the fastener 36 being attached to the second recess 31B). The third and fourth recesses (holes) 31C and 31D are not fixed by the fastener 36 and remain as remnant engaging portions.

(c) in FIG. 4 shows the electronic apparatus 2C to which the storage device having the third standard length L3 is connected and fixed with the connector 6 and the fixation structure 7. The storage device 1 is attachable to the electronic apparatus 2B when the board 11 is cut to have the third standard length L3. The storage device 1 is fixed by the fastener 36 passing through the third recess 31C of the third receiver 22C (i.e., by the fastener 36 being attached to the third recess 31C). The fourth recess (hole) 31D is not fixed by the fastener 36 and remain as remnant engaging portions.

(d) in FIG. 4 shows the electronic apparatus 2D to which the storage device having the fourth standard length L4 is connected and fixed with the connector 6 and the fixation structure 7. The storage device 1 is attachable to the electronic apparatus 2B when the board 11 is cut to have the fourth standard length L4. The storage device 1 is fixed by the fastener 36 passing through the fourth recess 31D of the fourth receiver 22D (i.e., by the fastener 36 being attached to the fourth recess 31D).

Next, the first to fourth conductive patterns 23A, 23B, 23C, and 23D will be described.

As shown in FIG. 2, the first to fourth conductive patterns 23A, 23B, 23C, and 23D are provided on the surface of the board 11 and are exposed to the outside of the board 11. Here, the board 11 includes the first surface 39a and a second surface 39b. The first surface 39a faces the head 36b of the fastener 36. The second surface 39b is positioned opposite to the first surface 39a. The second surface 39b faces the circuit board 5 (or inner surface of the case 4) of the electronic apparatus 2. Each of the first to fourth conductive patterns 23A, 23B, 23C, and 23D includes a first portion (e.g., a first region, first terminal) 41 and a second portion (e.g., a second region, second terminal) 42. The first portions 41 of the first to fourth conductive patterns 23A, 23B, 23C, and 23D are provided on the first surface 39a. The second portions 42 of the first to fourth conductive patterns 23A, 23B, 23C, and 23D are provided on the second surface 39b. The first to fourth conductive patterns 23A, 23B, 23C, and 23D are formed by gold plating or the like on a third conductive layer 53 and a fourth conductive layer 54 (refer to FIG. 5) which are described below.

As shown in FIG. 2, the first conductive pattern 23A is provided along the first receiver 22A. For example, each of the first portion 41 and the second portion 42 of the first conductive pattern 23A is formed in the shape of an arc extending along the first recess 31A.

Here, the fastener 36 is a metal screw member, for example. The fastener 36 is electrically connected to ground G of the electronic apparatus 2 through the supporter 35 of the fixation structure 7. The first portion 41 of the first conductive pattern 23A is in contact with the head 36b of the fastener 36 when the fastener 36 is attached to the first receiver 22A. The first portion 41 of the first conductive pattern 23A is electrically connected to the fastener 36, and to the ground G through the fastener 36.

The supporter 35 includes a metal surface layer, for example. The metal surface layer is formed by metal plating or electric conductive coating, for example. Alternatively, the supporter 35 may be made of metal. The supporter 35 is electrically connected to the ground G of the electronic apparatus 2. The second portion 42 of the first conductive pattern 23A is in contact with the support surface 35a of the supporter 35 when the fastener 36 is attached to the first receiver 22A. The second portion 42 of the first conductive pattern 23A is electrically connected to the supporter 35, and to the ground G through the supporter 35.

Each of the second to fourth conductive patterns 23B, 23C, and 23D is the substantially the same as the first conductive pattern 23A. For example, in the above description, the description of the first conductive pattern 23A may be applicable to each of the second to fourth conductive patterns 23B, 23C, and 23D, the description of the first receiver 22A may be applicable to each of the second to fourth receivers 22B, 22C, and 22D, and the description of the first recess 31A may be applicable to each of the second to fourth recesses 31B, 31C, and 31D. For example, the first portion 41 of the second conductive pattern 23B is electrically connected to the fastener 36 and to the ground G through the fastener 36 when the fastener 36 is attached to the second receiver 22B. The first portion 41 of the third conductive pattern 23C is electrically connected to the fastener 36 and to the ground G through the fastener 36 when the fastener 36 is attached to the third receiver 22C. The first portion 41 of the fourth conductive pattern 23D is electrically connected to the fastener 36 and to the ground G through the fastener 36 when the fastener 36 is attached to the fourth receiver 22D.

Next, the ground pattern 24 will be described. The ground pattern 24 is an example of "ground" of the board 11.

FIG. 5 is a cross-sectional view of the board 11 according to the present embodiment.

As shown in FIG. 5, the board 11 is a so-called four-layer board, for example. That is, the board 11 includes the first to third insulating layers (i.e., insulators) 45, 46, and 47, and first to fourth conduction layers 51, 52, 53, and 54. The first to third insulating layers 45, 46, and 47 are made of an insulating material like a glass epoxy resin, for example. The first to fourth conduction layers 51, 52, 53, and 54 are made of an electric conductive material like copper, for example.

The first insulating layer (e.g., core) 45 is located in a central part of the board 11 in Z direction. The first conductive layer 51 is laminated on the first insulating layer 45. The first conductive layer 51 forms a first inner layer pattern. The second conductive layer 52 is laminated on a surface of the first insulating layer 45 opposite to the surface on which the first conductive layer 51 is laminated. The second conductive layer 52 forms a second inner layer pattern.

The second insulating layer 46 is laminated on the first insulating layer 45 with the first conductive layer 51 and an adhesion layer (not illustrated) therebetween. Similarly, the third insulating layer 47 is laminated on the first insulating layer 45 with the second conductive layer 52 and an adhesion layer (not illustrated) therebetween.

The third conductive layer 53 is laminated on a surface of the second insulating layer 46 opposite to the surface on which the first conductive layer 51 is laminated. The third conductive layer 53 forms a first surface layer pattern. The third conductive layer 53 is covered with a protection layer (e.g., resist layer).

The fourth conductive layer 54 is laminated on a surface of the third insulating layer 47 opposite to the surface on which the second conductive layer 52 is laminated. The fourth conductive layer 54 forms a second surface layer pattern. The fourth conductive layer 54 is covered with a protection layer (e.g., resist layer).

As shown in FIG. 5, at least part of each of the third conductive layer 53 and the fourth conductive layer 54 is a so-called plane layer, and are formed in the shape of a plane extending in +X direction and in Y direction. For example, the remaining copper rate of the third conductive layer 53 is higher than at least one of the remaining copper rate of the first conductive layer 51 and the remaining copper rate of the second conductive layer 52. The remaining copper rate of the fourth conductive layer 54 is higher than at least one of the remaining copper rate of the first conductive layer 51 and the remaining copper rate of the second conductive layer 52.

There is a first difference in remaining copper rate between the third conductive layer 53 and the first conductive layer 51. There is a second difference in remaining copper rate between the third conductive layer 53 and the second conductive layer 52. There is a third difference in remaining copper rate between the fourth conductive layer 54 and the first conductive layer 51. There is a fourth difference in remaining copper rate between the fourth conductive layer 54 and the second conductive layer 52. There is a fifth difference in remaining copper rate between the third conductive layer 53 and the fourth conductive layer 54. The fifth difference is smaller than at least one of the first difference, the second difference, the third difference, and the fourth difference. Alternatively, the fifth difference may be smaller than all of the first difference, the second difference, the third difference, and the fourth difference. The "remaining copper rate" is a value obtained by dividing the area of the pattern portion (i.e., conductive portion) in a region with a gross area of the region (e.g., the gross area of the board).

In the present embodiment, the ground pattern 24 is formed by at least part of the third conductive layer 53 and at least part of the fourth conductive layer 54. In other words, the ground pattern 24 includes a first ground layer 56 formed by at least part of the third conductive layer 53 and a second ground layer 57 formed by at least part of the fourth conductive layer 54. That is, the second ground layer 57 is positioned in a side of the board 11 opposite to the side in which the first ground layer 56 is positioned, with respect to the central part of the board 11 in Z direction. From another viewpoint, the first ground layer 56 is closer to the first surface 39a of the board 11 than to the second surface 39b of the board 11. The second ground layer 57 is closer to the second surface 39b of the board 11 than to the first surface 39a of the board 11. Each of the first ground layer 56 and the second ground layer 57 extends, in X direction, across a region between the first receiver 22A and the second receiver 22B, and a region between the second receiver 22B and the terminal portion 21 (refer to FIG. 6). For example, each of the first ground layer 56 and the second ground layer 57 extends across the whole length of the board 11 in X direction. From another viewpoint, each of the first ground layer 56 and the second ground layer 57 extends from the first region 14a to the fourth region 14d through the second and third regions 14b and 14c.

The first conductive layer 51 and the second conductive layer 52 are disposed between the ground patterns 24 (e.g., the first ground layer 56 and the second ground layer 57). For this reason, it may be possible to decrease influence of an unnecessary radiation caused by high frequency signals passing the first conductive layer 51 and the second conductive layer 52. Also, it may also be possible to decrease the influence of unnecessary radiation from the outside toward the first conductive layer 51 and the second conductive layer 52.

The plurality of terminals 21a of the terminal portion 21 includes a grand terminal electrically connected to the ground G of the electronic apparatus 2 through the connector 6. The ground pattern 24 is electrically connected to the grand terminal and to the ground G of the electronic apparatus 2 through the connector 6. The ground pattern 24 extends across an overall length of the board 11 and is electrically connected to each of the first to fourth conductive patterns 23A, 23B, 23C, and 23D. That is, the ground pattern 24 is electrically connected to the ground G of the electronic apparatus 2 through one of the first to fourth conductive patterns 23A, 23B, 23C, and 23D and the fixation structure 7 of the electronic apparatus 2.

Figure 6:
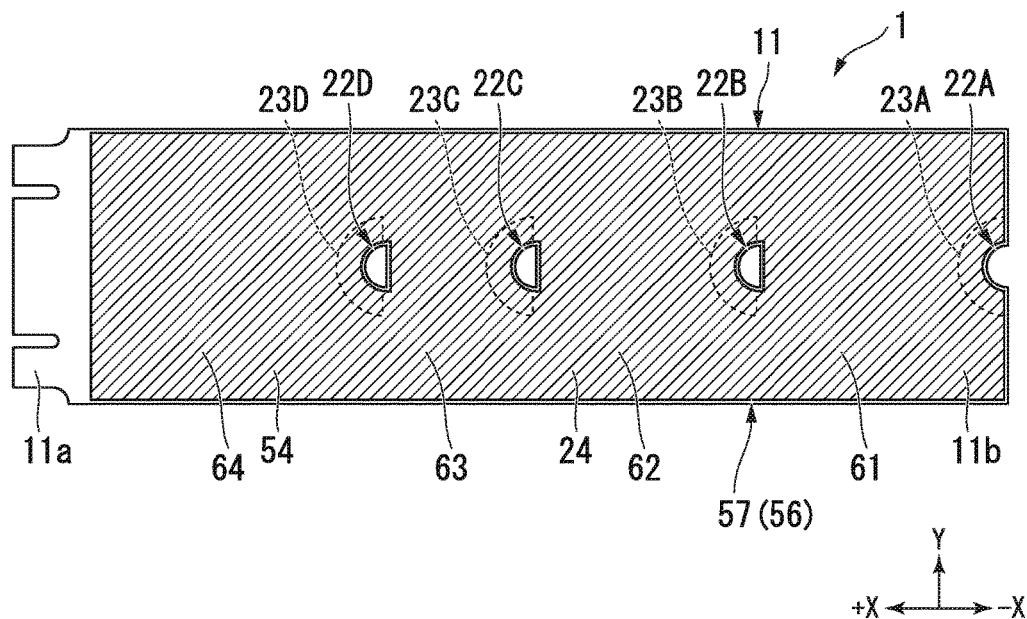
FIG. 6 is a cross-sectional view of the storage device taken along F6-F6 line in FIG. 5.

FIG. 6 is a cross-sectional view of the board 11 take along F6-F6 line in FIG. 5. As shown in FIG. 6, the second ground layer 57 includes first to fourth portions 61, 62, 63, and 64. The first portion (e.g., a first region) 61 extends between the first receiver 22A and the second receiver 22B. The second portion (e.g., a second region) 62 extends between the second receiver 22B and the third receiver 22C. The third portion (e.g., a third region) 63 extends between the third receiver 22C and the fourth receiver 22D. The fourth portion (e.g., the fourth region) 64 extends between the fourth receiver 22D and the terminal portion 21 (e.g., the first end portion 11a of the board 11). Each of the first to fourth portions 61, 62, 63, and 64 is formed in the shape of a plane expanding in X and Y directions. The first to fourth portions 61, 62, 63, and 64 are mutually connected. For example, each of the first to fourth portions 61, 62, 63, and 64 of the second ground layer 57 is larger in area than that of the first to fourth conductive patterns 23A 23B, 23C, and 23D, respectively. "Larger in area than the first conductive pattern 23A" means larger than the sum of the areas of the first and second portions 41 and 42 of the first conductive pattern 23A, for example. This definition is the same for the second to fourth conductive patterns 23B, 23C, and 23D. Furthermore, the first ground layer 56 may include the first to fourth portions 61, 62, 63, and 64, similarly to the second ground layer 57. Each of the first to fourth portions 61, 62, 63, and 64 of the first ground layer 56 is larger in area than that of the first to fourth conductive patterns 23A 23B, 23C, and 23D, respectively.

Next, the memory component 12 will be described. As shown in FIG. 2, the memory component (e.g., a memory chip component) 12 is a package component in which a plurality of element parts are integrated by mold resin. The memory component 12 is an example of "memory circuitry", a "memory circuit", and a "SSD circuit". In more details, the memory component 12 includes a plurality of nonvolatile memory components 71, a memory controller 72, a power supply component 73, and a mold resin 74. The mold resin 74 integrally covers the plurality of memory components 71, the memory controller 72, and the power supply component 73.

The nonvolatile memory component 71 is an example of "semiconductor memory" and a "semiconductor memory component". The nonvolatile memory component 71 is NAND flash memory, for example. A "semiconductor memory component" is not limited to the above-described example.

The memory controller (e.g., control circuit) 72 is electrically connected to the terminal portion 21 (e.g., electrically connected to the terminals 21a), and is configured to communicate with the electronic apparatus 2 through the terminal portion 21. The memory controller 72 receives, from the electronic apparatus 2, write demands, read demands, and deletion demands for the nonvolatile memory components 71. The memory controller 72 controls the nonvolatile memory components 71 based on these demands.

The power supply component (e.g., power supply circuit) 73 generates voltages suitable for the element components (e.g., the nonvolatile memory components 71 and the memory controller 72) included in the memory component 12 based on power supplied from the electronic apparatus 2. The power supply component 73 supplies the generated voltages to the element components.

Here, for convenience of explanation, the receiver (e.g., the fourth receiver 22D) which is nearest to the terminal portion 21 among the plurality of receivers (e.g., the first to fourth receivers 22A, 22B, 22C, and 22D) is called as a terminal-side receiver 22T. The board 11 includes a component-mounting region MR between the terminal-side receiver 22T and the terminal portion 21. The memory component 12 is provided in the component-mounting region MR. The board 11 includes circuit patterns 75 (refer to FIG. 5). The circuit patterns 75 connect the memory component 12 and the terminal portion 21. Signals pass through the circuit patterns 75. The circuit patterns 75 are provided only in the component-mounting domain MR. That is, the components or circuit patterns relevant to operation of the memory component 12 is not provided between the terminal side receiver 22T and the second end portion 11b of the board 11. Only the ground pattern 24 is provided between the terminal-side receiver 22T and the second end portion 11b of the board 11. For this reason, even when the board 11 is cut to have any of the second to fourth standard lengths L2, L3, and L4, the memory component 12 is able to communicate with the electronic apparatus (e.g., host device) 2 through the connector 6. From another viewpoint, the memory circuitry is configured to communicate with the electronic apparatus 2 through the connector 6 even when the first to third regions 14a, 14b, and 14c are removed.

According to such a structure, the length of the storage device 1 is adjustable to two or more standard lengths of the predetermined standard. For example, in product development of the storage device 1 complying with the M.2 standard, the board design of products having a plurality of standard lengths (e.g., 30 mm, 42 mm, 62 mm, 80 mm, 110 mm) is carried out for every standard. In this case, it may be difficult to reduce the cost of development.

On the other hand, the storage device 1 of the present embodiment includes the board 11 and the memory component 12 as an example of memory circuitry. The board 11 includes the terminal portion 21, the first receiver 22A, and the second receiver 22B. The terminal portion 21 is connectable to the connector 6 of the electronic apparatus 2. The first receiver 22A is disposed in the end portion 11b of the board 11, which is opposite to the terminal portion 21. The fastener 36 is attachable to the first receiver 22A. The fastener 36 fixes the board 11 to the electronic apparatus 2. The second receiver 22B is between the terminal portion 21 and the first receiver 22A. The fastener 36 is attachable to the second receiver 22A when the board 11 is cut along a line corresponding to the second receiver 22B.

According to such a configuration, one storage device 1 can have two or more standard lengths of the predetermined standard. That is, the user who purchases the storage device 1 may obtain a storage device 1 which has a desired standard length by cutting the board 11 at a desired position. For this reason, it is not necessary to develop products of two or more standard lengths. Thereby, a reduction of the cost of development may be achieved through communalization of products. Further, reduction of the product price may be achieved through mass production of the products. Moreover, it may be possible to shorten the development period of the products if it is not necessary to develop products of two or more standard lengths.

In the present embodiment, the memory component 12 as an example of memory circuitry is provided on the board 11 between the terminal portion 21 and the second receiver 22B. According to such a configuration, even when the board 11 is cut, for example along a line corresponding to the second receiver 22B, the electrical function of the memory component 12 may not change. Namely, even when the board 11 is cut along the line corresponding to the second receiver 22B, the memory component 12 is able to communicate with the electronic apparatus 2 through the connector 6. For this reason, even when the board 11 is cut, it may be possible to secure a stability of operation of the storage device 1.

In the present embodiment, the standard with which the storage device 1 complies defines at least the first standard length L1 and the second standard length L2 as the lengths of the board 11. The board 11 has the first standard length L1. The second receiver 22B is positioned in an end portion 11b (e.g., new end portion 11b) of the board 11 when the board 11 is cut by the second standard length L2. According to such a configuration, as described above, one storage device 1 is adjustable to two or more standard lengths of the predetermined standard.

In the present embodiment, the first receiver 22A includes the insertion portion (e.g., the first recess 31A) into which the fastener 36 is insertable in the thickness direction of the board 11. The second receiver 22B includes the insertion portion (e.g., the second recess 31B) into which the fastener 36 is insertable in the thickness direction of the board 11 when the board 11 is cut along the line corresponding to the second receiver 22B.

According to such a configuration, the board 11 may be fixed comparatively firmly by the fastener 36 inserted into the insertion portion. Moreover, according to such a configuration, one storage device 1 is adjustable to two or more standard lengths of the predetermined standard, which is related to the fastener 36 that passes the board 11 in the thickness direction thereof.

In the present embodiment, the fastener 36 includes the axial portion 36a having the threads. The insertion portion of each of the first receiver 22A and the second receiver 22B includes the surface 31s which is in the shape of an arc along the axial portion 36a. According to such a configuration, the board 11 may be fixed more stably by the fastener 36.

In the present embodiment, the board 11 includes the first conductive pattern 23A, the second conductive pattern 23B, and the ground pattern 24. The first and second conductive patterns 23A and 23B are exposed to the outside of the board 11. The first conductive pattern 23A is in contact with the fastener 36 and electrically connected to the fastener 36 when the fastener 36 is attached to the first receiver 22A. The second conductive pattern 23B is in contact with the fastener 36 and electrically connected to the fastener 36 when the fastener 36 is attached to the second receiver 22B. The ground pattern 24 is electrically connected to the first conductive pattern 23A and the second conductive pattern 23B.

According to such a configuration, when the fastener 36 is attached to the first receiver 22A, or when the fastener 36 is attached to the second receiver 22B, the ground pattern 24 is electrically connected to the ground G of the electronic apparatus 2 through the fastener 36. Thereby, it may be possible to improve stability of operation of the storage device 1.

In the present embodiment, the board 11 includes the third receiver 22C between the terminal portion 21 and the second receiver 22B. The third receiver 22C includes substantially the same shape as each of the first receiver 22A and the second receiver 22B. The fastener 36 is attachable to the third receiver 22C when the board 11 is cut along a line corresponding to the third receiver 22C. According to such a configuration, one storage device 1 is adjustable to three or more standard lengths.

In the present embodiment, the storage device 1 is also adjustable to the third standard length L3 as the length of the board 11. The third receiver 22C is positioned in an end portion 11b (i.e., new end portion 11b) of the board 11 when the board 11 is cut to have the third standard length L3. According to such a configuration, as described above, one storage device 1 is adjustable to three or more standard lengths.

In the present embodiment, the board 11 includes the third conductive pattern 23C. The third conductive pattern 23C is exposed to the outside of the board 11. The third conductive pattern 23C is in contact with the fastener 36 and electrically connected to the fastener 36 when the fastener 36 is attached to the third receiver 22C. The ground pattern 24 is electrically connected to the third conductive pattern 23C. According to such a configuration, even when the fastener 36 is attached to the third receiver 22C, the ground pattern 24 is electrically connected to the ground G of the electronic apparatus 2 through the fastener 36. Thereby, it may be possible to improve stability of operation of the storage device 1.

In the present embodiment, the ground pattern 24 includes the first portion 61 between the first receiver 22A and the second receiver 22B, and the second portion 62 between the second receiver 22B and the terminal portion 21. According to such a configuration, it may be possible to make the remaining copper rate in the region between the first receiver 22A and the second receiver 22B close to the remaining copper rate in the region between the second receiver 22B and the terminal portion 21. Thereby, at the time of board manufacture, it may be possible to make the shape (e.g., curvature) of the region between the first receiver 22A and the second receiver 22B similar to the shape (e.g., curvature) of the region between the second receiver 22B and the terminal portion 21. Thereby, the shapes in many regions of the board 11 may become similar. It may become easy to manage the shapes at the time of manufacture of the board 11. Thereby, it may be possible to improve the manufacturability of the board 11. Further, as the manufacturability of the board 11 can be improved, it may be possible to reduce the cost of the board 11.

Here, a thermal expansion coefficient of a conductive material which forms the first to fourth conductive layers 51, 52, 53, and 54 differs from a thermal expansion coefficient of an insulation material which forms the first to third insulating layer 45, 46, and 47. For this reason, if a ground layer is provided only on one surface of the board 11, the ground layer may cause the curvature of the board 11.

To deal with the issue, in the present embodiment, the ground pattern 24 includes the first ground layer 56 and the second ground layer 57. The first ground layer 56 extends across the region between the first receiver 22A and the second receiver 22B and the region between the second receiver 22B and the terminal portion 21. The second ground layer 57 is provided on a surface of the board 11 opposite side to the surface on which the first ground layer 56 is provided, with respect to the central part of the board 11 in the thickness direction thereof. The second ground layer 57 extends across the region between the first receiver 22A and the second receiver 22B and the region between the second receiver 22B and the terminal portion 21.

According to such a configuration, the first ground layer 56 and the second ground layer 57 are provided separately in both sides of the central part of the board 11 in the thickness direction thereof. Moreover, both the first ground layer 56 and the second ground layer 57 are provided also in the region between the first receiver 22A and the second receiver 22B. For this reason, power acting on the front and power acting on the back with respect to the central part of board 11 in the thickness direction thereof may easily become similar each other. Therefore, it may be possible to control the curvature of the board 11 at the time of manufacture. Thereby, it may be possible to improve the manufacturability of the board 11.

In the present embodiment, each of the first ground layer 56 between the first receiver 22A and the second receiver 22B (i.e., the first portion 61 of the first ground layer 56), and the second ground layer 57 between the first receiver 22A and the second receiver 22B (i.e., the first portion 61 of the second ground layer 57) is larger in area than the first conductive pattern 23A.

According to such a configuration, the comparatively large ground pattern 24 may be provided between the first receiver 22A and the second receiver 22B. Thereby, it may be possible to make the remaining copper rate in the region between the first receiver 22A and the second receiver 22B further close to the remaining copper rate in the region between the second receiver 22B and the terminal portion 21. Thereby, properties in many regions of the board 11 may become similar. Therefore, it may become easy to manage the properties of the board 11 at the time of manufacture. Thereby, it may be improve the manufacturability of the board 11.

Next, some modifications of the above embodiment will be described. The elements except for those described below are the same as those of the first embodiment.

(First Modification)

Figure 7:
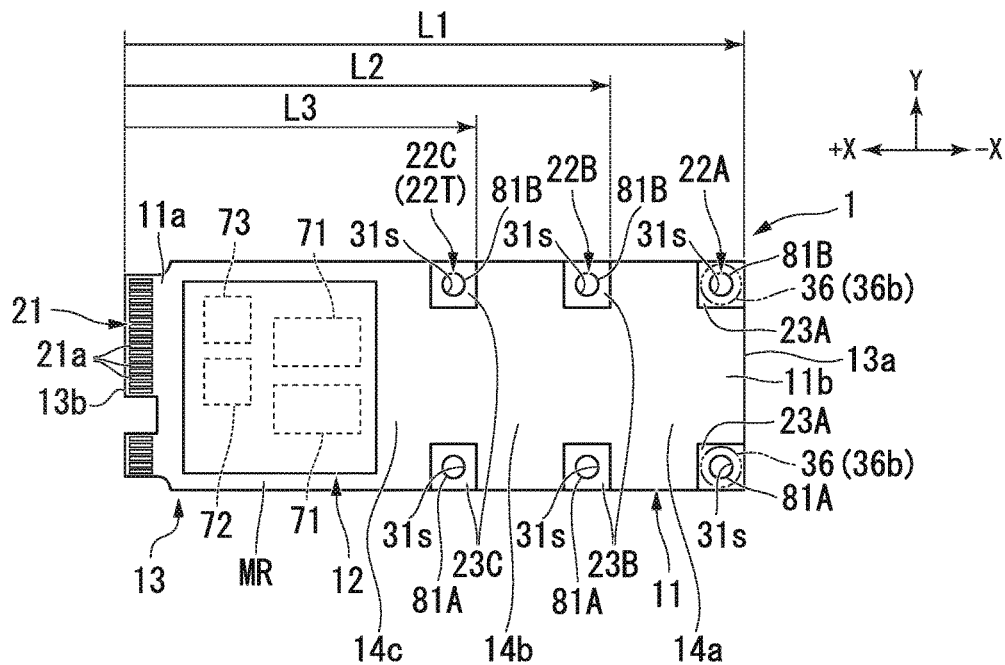
FIG. 7 is a plan view of the storage device according to a first modification of the first embodiment.

FIG. 7 shows a storage device 1 according to a first modification. As shown in FIG. 7, the storage device 1 of the present modification is adjustable to the first to third standard length (e.g., the first to third standard size) L1, L2, and L3. The board 11 has, as the board length, the first standard length L1 which is the longest in the first to third standard lengths L1, L2, and L3 at the time the board 11 is produced (e.g., at the time the product is released in a market). Moreover, the board 11 of the present modification includes the terminal portion 21, the first to third receivers 22A, 22B, and 22C, the first to third conductive patterns 23A, 23B, and 23C, and the ground pattern 24, similarly to the first embodiment.

In the present modification, each of the first to third receivers 22A, 22B, and 22C includes two holes 81A and 81B formed in opposite end portions of the board 11 in Y direction 11. Each of the two holes 81A and 81B is an example of the "insertion portion" into which the fastener 36 is insertable in the thickness direction of the board 11. Each of the two holes 81A and 81B includes the surface 31s which is in the shape of an arc along the axial portion 36a of the fastener 36.

(Second Modification)

Figure 8:
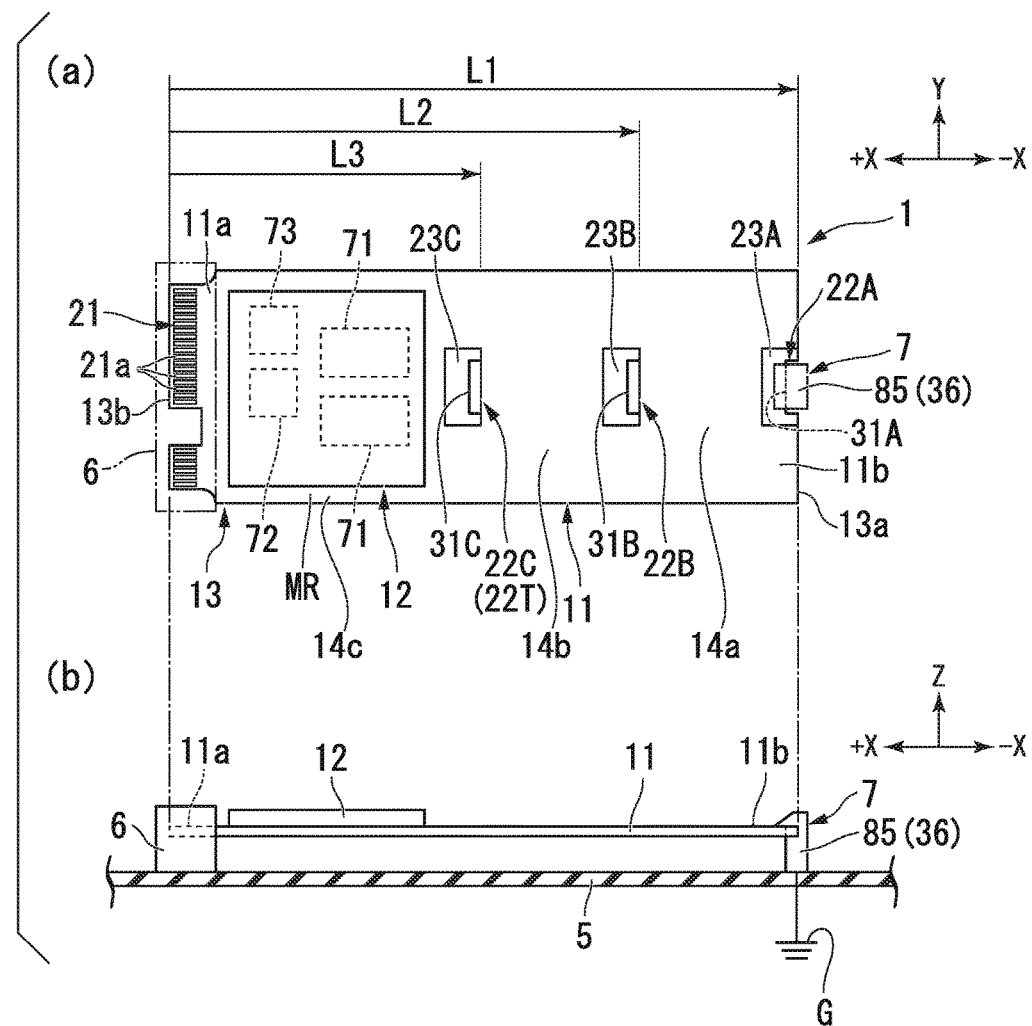
FIG. 8 is a top view and a side view of the storage device according to a second modification of the first embodiment.

FIG. 8 shows a storage device 1 according to a second modification. The elements except for those described below are the same as those of the first modification.

As shown in FIG. 8, the electronic apparatus 2 of the present modification includes, instead of a screw member, a hook 85 as the fastener 36 of the fixation structure 7.

The first receiver 22A is provided in the second end portion 11b of the board 11, and includes a first recess 31A configured to engage with the hook 85. Here, the hook 85 includes a conductive surface coat, for example, and is electrically connected to the ground G of the electronic apparatus 2. The first conductive pattern 23A is provided in the circumference of the first recess 31A. The first conductive pattern 23A is in contact with the hook 85, and electrically connected to the ground G of the electronic apparatus 2 through the hook 85.

Similarly, the second and third receivers 22B and 22C include the second or third recess 31B and 31C configured to engage with the hook 85 when the board 11 is cut to have the second standard length L2 or the third standard length L3. Moreover, the board 11 includes the second and third conductive patterns 23B and 23C each of which is in contact with the hook 85 and electrically connected to the hook 85 when the hook 85 is attached to the second or third receivers 22B and 22C.

Even with the configuration of these modifications, one storage device 1 is adjustable to two or more standard lengths.

Second Embodiment

Next, with reference to FIG. 9 to FIG. 11, a second embodiment will be described.

A storage device 1 of the present embodiment includes a weak portion (fragile portion) 91. The second embodiment differs from the first embodiment in this point.

The other elements of the storage device 1 according to the second embodiment are the same as those of the first embodiment.

Figure 9:
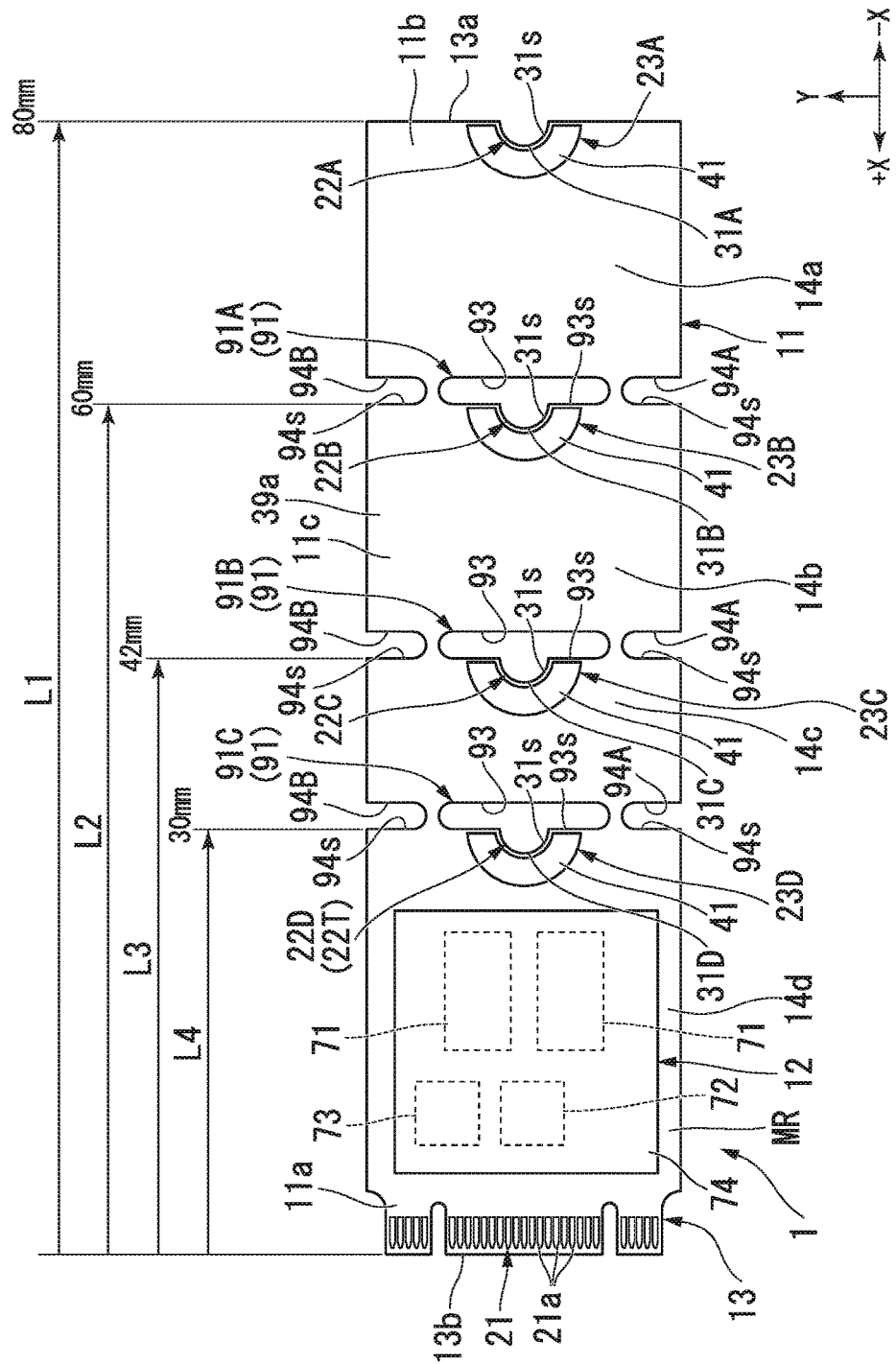
FIG. 9 is a plan view of a storage device according to a second embodiment.

FIG. 9 is a plan view of the storage device 1 according to the present embodiment.

As shown in FIG. 9, the board 11 of the present embodiment includes a weak portion (e.g., a low rigid portion, a cutting guide, a break portion, or a boundary portion) 91. The "weak portion (e.g., a low rigid portion, a cutting guide, a break portion, or a boundary portion)" means a portion of a board, which is smaller in rigidity (e.g., rigidity in Z direction) than another portion of the board (e.g., the second end portion 11b, the first end portion 11a, or the terminal portion 21). An example of the weak portion 91 has a hole or recess so as to make the rigidity of the board 11 smaller. However, the weak portion 91 is not limited to a portion having a hole or recess. The weak portion 91 may be a thin portion which is thinner than another portion of the board 11, such that the thin portion makes the rigidity of the board 11 smaller. Furthermore, the weak portion 91 may be a portion including material or an inner structure (e.g., inner layer structure) which differs from those of another portion of the board 11, such that the material of the inner structure makes the rigidity of the board 11 smaller.

As shown in FIG. 9, the weak portion 91 of the present embodiment includes first to third weak portions 91A, 91B, and 91C. Each of the first to third weak portions 91A, 91B, and 91C may be called the first to third low-rigid portions, cutting guides, break portions, or boundary portions. The "break" in the present disclosure means a boundary (e.g., division) between a plurality of regions. That is, the "break" in the present disclosure is not limited to a portion including a cut.

The first weak portion 91A is provided between the first receiver 22A and the second receiver 22B, and is adjacent to (or in a vicinity of) the second receiver 22B. The first weak portion 91A is provided along Y direction. The first weak portion 91A is provided in a position corresponding to the second standard length L2. "The first weak portion 91A is provided in a position corresponding to the second standard length L2" means that the board 11 has the second standard length L2 when the board 11 is cut along a line corresponding to the first weak portion 91A. This definition of the first weak portion 91A is applicable to each of the second and third portions 91B and 91C. That is, the description of the first weak portion 91A may be applicable to each of the second and third weak portions 91B and 91C, and the description of the second standard length L2 may be applicable to each of the third and fourth standard lengths L3 and L4 in the above description.

The second weak portion 91B is provided between the second receiver 22B and the third receiver 22C, and is adjacent to (or in a vicinity of) the third receiver 22C. The second weak portion 91B is provided along Y direction. The second weak portion 91B is provided in a position corresponding to the third standard length L3.

Similarly, the third weak portion 91C is provided between the third receiver 22C and the fourth receiver 22D, and is adjacent to (or in a vicinity of) the fourth receiver 22D. The third weak portion 91C is provided along Y direction. The third weak portion 91C is provided in a position corresponding to the third standard length L4.

In the present embodiment, each of the first to third weak portions 91A, 91B, and 91C has a long hole (e.g., slit) 93 and a pair of recesses 94A and 94B.

The long hole 93 is provided in a central part of the board 11 in Y direction. The long hole 92 is provided along Y direction. The long holes 93 of the first to third weak portions 91A, 91B, and 91C are connected to the recesses 31B. 31C, and 31D of the second to fourth receivers 22B, 22C, and 22D, respectively. For example, the long hole 93 of each of the first to third weak portions 91A, 91B, and 91C has an inner surface 93s which is positioned in +X direction side of the hole 93. The inner surfaces 93s of the long holes 93 of the first to third weak portions 91A, 91B, and 91C correspond positions of the second to fourth lengths L2, L3, and L4, respectively. "An inner surface of a hole (or an inner surface of a recess) corresponds to a standard length" in the present disclosure includes a case where the board 11 has the standard length after the board 11 is cut along the inner surface of the hole (or the inner surface of the recess) and a secondary work like filing is performed on the cut surface of the board 11.

The pair of recesses 94A and 94B is provided separately in opposite sides of the long hole 93 in Y direction. The pair of recesses 94A and 94B is provided on side end portions 11c of the board 11. The pair of recesses 94A and 94B extends along Y direction. For example, the recesses 94A and 94B of each of the first to third weak portions 91A, 91B, and 91C have inner surfaces 94s which are positioned in +X direction side of the recesses 94A and 94B. The inner surfaces 94s of recesses 94A and 94B of the first to third weak portions 91A, 91B, and 91C correspond positions of the second to fourth lengths L2. L3, and L4, respectively.

Figure 10:
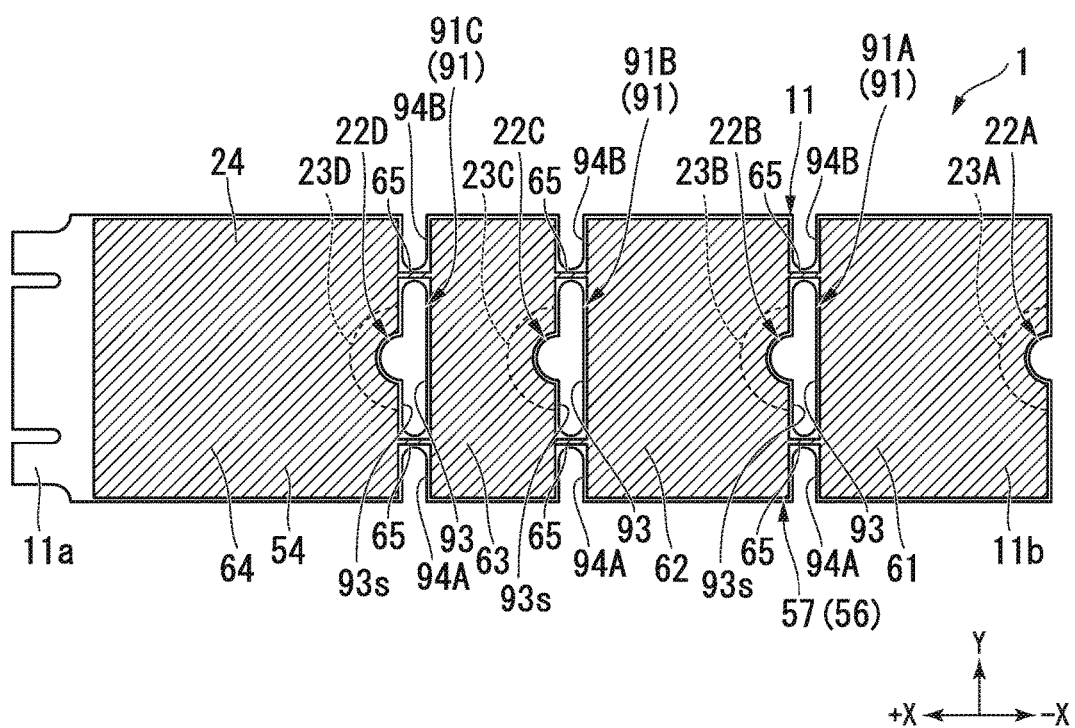
FIG. 10 is a cross-sectional view of the storage device according to the second embodiment.

FIG. 10 shows the ground pattern 24 of the board 11 according to the present embodiment. As shown in FIG. 10, each of the first ground layer 56 and the second ground layer 57 of the ground pattern 24 of the present embodiment includes the first to fourth portions 61, 62, 63, and 64, similarly to the first embodiment. In the present embodiment, the first portion 61 is positioned between the first receiver 22A and the first weak portion 91A. The second portion 62 is positioned between the second receiver 22B and the second weak portion 91B. The third portion 63 is positioned between the third receiver 22C and the third weak portion 91C. The fourth portion 64 is positioned between the fourth receiver 22D and the terminal portion 21 (e.g., end portion 11a of the board 11), similarly to the first embodiment. Also, the first to fourth portions 61, 62, 63, and 64 of the first ground layer 56 are larger in area than the first to fourth conductive patterns 23A23B, 23C, and 23D, respectively. Similarly, the first to fourth portions 61, 62, 63, and 64 of the second ground layer 57 are larger in area than the first to fourth conductive patterns 23A 23B, 23C, and 23D, respectively.

In the present embodiment, each of the first ground layer 56 and the second ground layer 57 includes connection portions 65. The connection portions 65 connects the first to fourth portions 61, 62, 63, and 64 through areas between the long hole 93 and the recesses 94A and 94B of the first to third weak portions 91A, 91B, and 91C. That is, the connection portions 65 electrically connect the first to fourth portions 61, 62, 63, and 64 one another.

Figure 11:
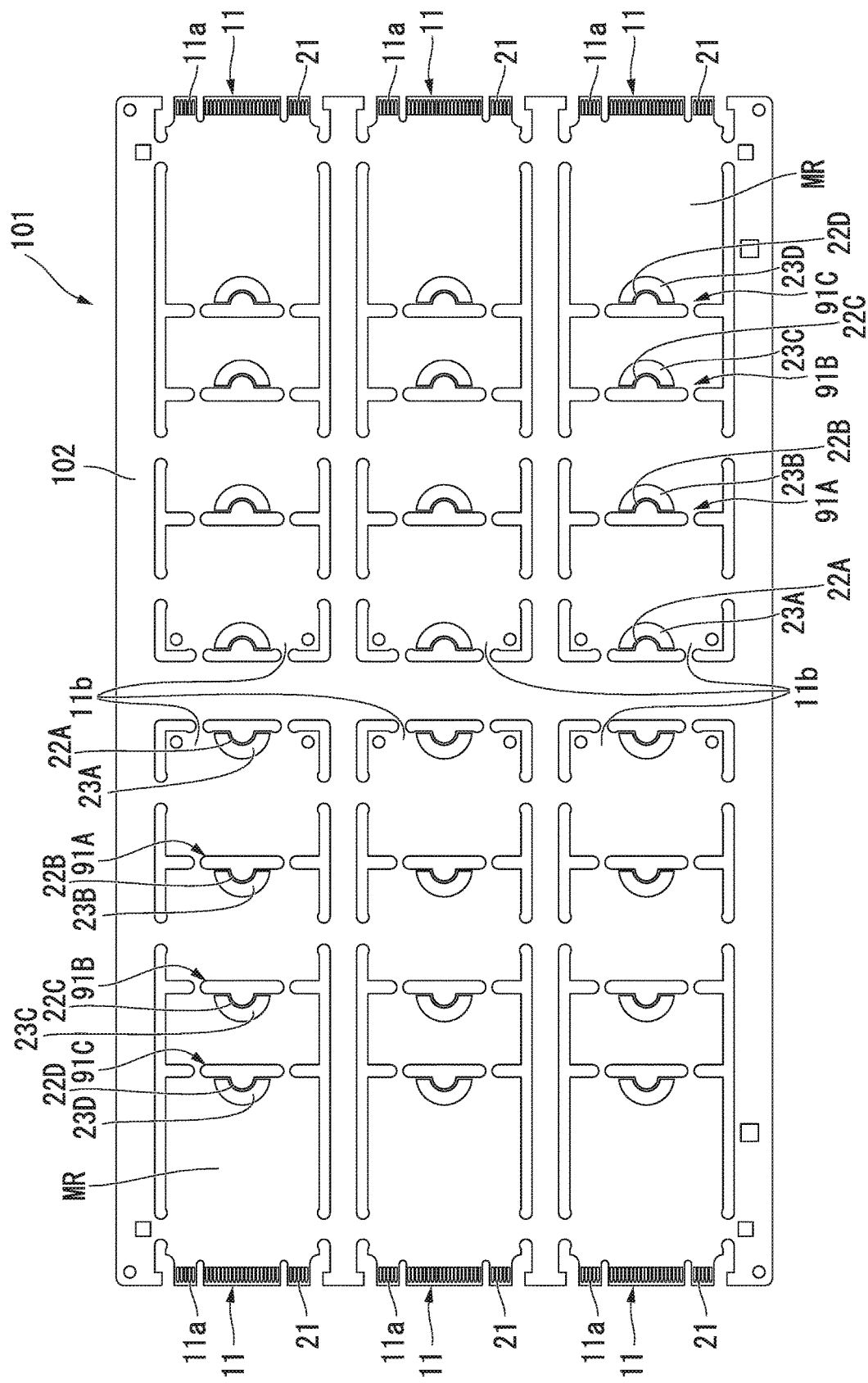
FIG. 11 is a plan view of a board set including a plurality of boards according to the second embodiment.

FIG. 11 is a plan view of a board set 101 including a plurality of boards 11. As shown in FIG. 11, the board set (i.e., a set of boards) 101, includes a plurality of boards 11 and a frame 102 which connects the plurality of boards 11. The lamination structure and circuit patterns of the plurality of boards 11 are formed in a state where the boards 11 are included in the board set 101. Each of the boards 11 in the board set 101 includes almost all main components of the storage device 1 except for the memory component 12. The memory component 12 is mounted on each of the boards 11 in a state where the boards 11 are included in the board set 101. Additionally, each storage device 1 is obtained by each corresponding board 11 being cut from the frame 102. The board 11 of the storage device 1 according to the first embodiment may be also formed as a part of board set 101, similarly to the present embodiment.

According to such a configuration, one storage device 1 is adjustable to two or more standard lengths of the predetermined standard, similarly to the first embodiment.

Moreover, in the present embodiment, the board 11 includes the weak portion 91. The weak portion 91 is provided along Y direction between the first receiver 22A and the second receiver 22B. The weak portion 91 is smaller in rigidity than the end portion 11b of the board 11. According to such a configuration, it may be easy to cut the board 11 at a position corresponding to a desired standard length with human hands, without using tools, such as a router cutter. Thereby, the convenience in manufacturing the storage device 1 may be improved.

In the present embodiment, the weak portion 91 includes the long hole 93 extending in Y direction. Since the board 11 breaks easily along the long hole 93 according to such a configuration, the board 11 may be cut more easily. Thereby, the convenience in manufacturing the storage device 1 may be improved.

In the present embodiment, the ground pattern 24 includes the first portion 61 between the first receiver 22A and the first weak portion 91A. The first portion 61 of the ground pattern 24 is larger in area than the first conductive pattern 23A. According to such a configuration, it may be possible to make the remaining copper rate in the region between the first receiver 22A and the first weak portion 91 close to the remaining copper rate in the region between the second receiver 22B and the terminal portion 21. Thereby, at the time of manufacturing the board 11, it may be possible to make the shape (e.g., curvature) of the region between the first receiver 22A and the first weak portion 91A close to the shape (e.g., curvature) of the region between the second receiver 22B and the terminal portion 21. Thereby, it may be possible to make shapes of many regions of the board 11 similar. Thereby, it may be possible to improve the manufacturability of the board 11.

In the present embodiment, the ground pattern 24 includes the second portion 62 and the connection portion 65. The second portion 62 is between the first weak portion 91A and the terminal portion 21. The connection portion 65 connects the first portion 61 and the second portion 62 through an area between the long hole 93 and one of the recesses 94A and 94B of the first weak portion 91. According to such a configuration, it is possible to electrically connect the first portion 61 and the second portion 62 of the ground pattern 24 in the board 11 including the first weak portion 91A having the hole 93 and the recesses 94A and 94B.

Next, some modifications of the above embodiment will be described. The elements except for those described below are the same as those of the second embodiment.

(First Modification)

Figure 12:
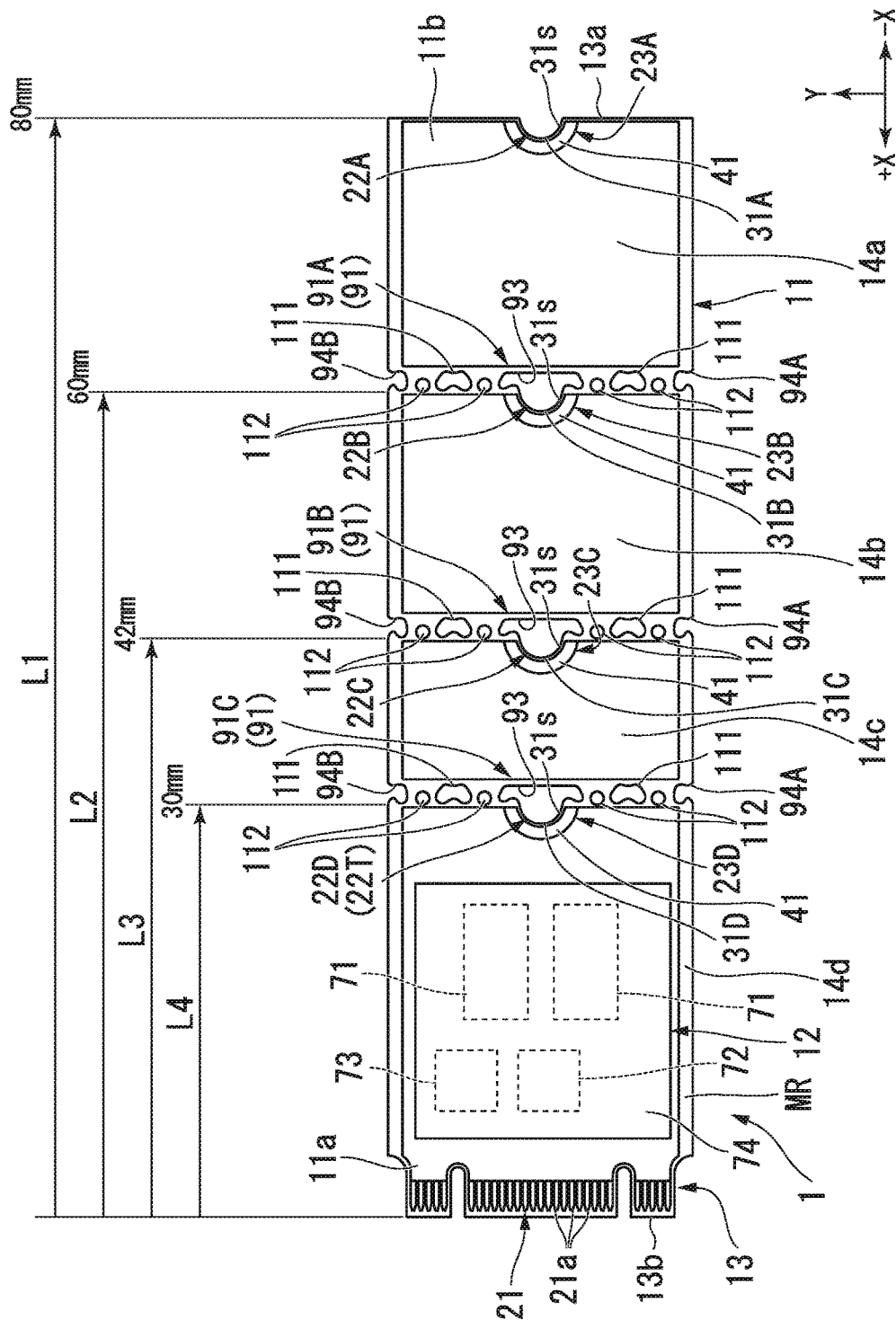
FIG. 12 is a plan view of the storage device according to a first modification of the second embodiment.

FIG. 12 shows a storage device 1 according to a first modification. As shown in FIG. 12, in the present modification, each of the first to third weak portions 91A, 91B. and 91C has a plurality of holes 93, 111, and 112. The plurality of holes 93, 111, and 112 is arranged in Y direction.

Figure 13:
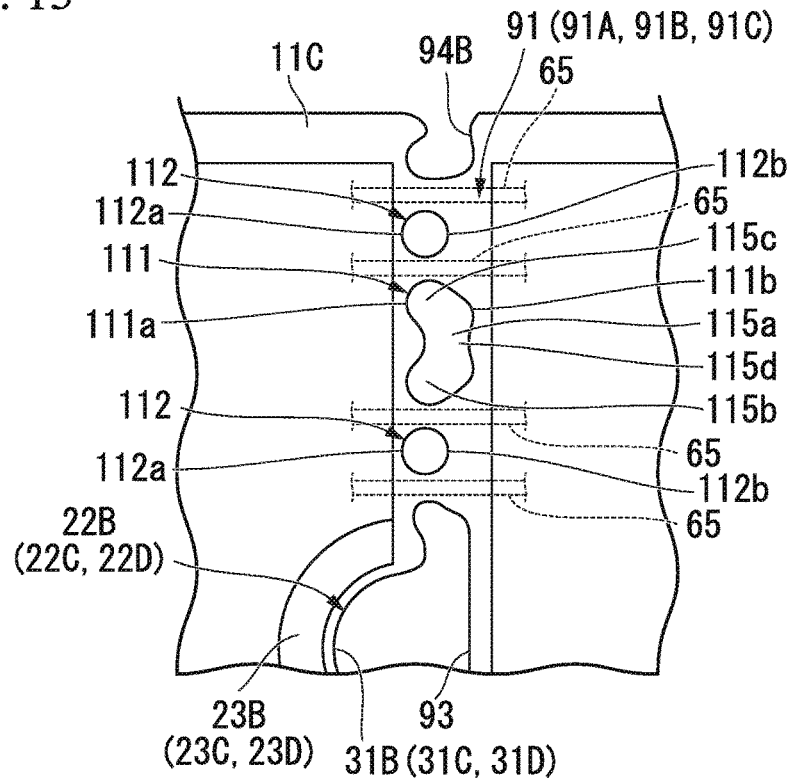
FIG. 13 is an enlarged plan view of the storage device shown in the FIG. 12.

FIG. 13 shows an enlarged view of a weak portion 91. As shown in FIG. 13, the plurality of holes 93, 111, and 112 includes the long hole 93, a first hole 111, and a second hole 112.

The first hole 111 has a central part 115a, a first projecting part 115b, and a second projecting part 11c. The central part 115a, the first projecting part 11b, and the second projecting part 115c are connected mutually. The first projecting part 115b is closer to the side end portion 11c of the board 11 than the central part 115a is (e.g., the first projecting part 115b is located in a Y direction side of the central part 115a). The first projecting part 11b projects in +X direction from the central part 115a. On the other hand, the second projecting part 115c is located in a side opposite to the first projecting part 115 with respect to the central part 115a (e.g., central side of the board 11). The second projecting part 115c projects in +X direction from the central part 11a.

The pair of second holes 112 is formed in opposite sides of the first hole 111 in Y direction. Of the pair of second holes 112, one second hole 112 is located between the first hole 111 and the long hole 93, and the other second hole 112 is located between the long hole 93 and the side end portion 11c of the board 11. Each of the second holes 112 is smaller than the first hole 111. The first hole 111 has a first edge 111a and a second edge 111b. The first edge 111a is located in a +X direction side of the first hole 112. The second edge 111b is located in a −X direction side of the first hole 112. The second hole 112 has a third edge 112a and a fourth edge 112b. The third edge 112a is located in a +X direction side of the second hole 112. The fourth edge 112b is located in a −X direction side of the second hole 112. The third edge 112a of the second hole 112 is substantially aligned with the first edge 111a of the first hole 111 in a line along Y direction. On the other hand, the fourth edge 112b of the second hole 112 is located further in +X direction side (i.e., the fourth edge 112b of the second hole 112 is closer to the terminal portion 21) than the second edge 111b of the first hole 111. From another viewpoint, the first hole 111 has a narrow portion 115d which is narrow in +X direction in the first hole 111. The pair of second holes 112 is located in +X direction side of the narrow portion 115d (i.e., the pair of second holes 112 is closer to the terminal portion 21 than the narrow portion 115d is).

From further another viewpoint, the weak portion 91 includes the first edge 111a and the second edge 111b. The first edge 111a faces the first hole 111. The second edge 111b is positioned opposite to the first edge 111a with respect to the first hole 111. The second edge 111b is closer to the first receiver 22A than the first edge 111a is. Furthermore, the weak portion 91 includes the third edge 112a and the fourth edge 112b. The third edge 112a faces to the second hole 112. The fourth edge 112b is positioned opposite to the third edge 112a with respect to the second hole 112. The fourth edge 112b is closer to the first receiver 22A than the third edge 112a is. In addition, the third edge 112a is substantially aligned with the first edge 111a in a line along Y direction. The fourth edge 112b is closer to the terminal portion 21 than the second edge 111b is.

According to such a configuration, the board 11 may be easily cut at a position corresponding to a desired standard length, similarly to the second embodiment.

In the present modification, the weak portion 91 includes the plurality of holes 93,111,112 arranged in Y direction. According to such a configuration, the board 1 may be cut even more easily, because the board 11 may be bent easily along the plurality of holes 93, 111, and 112. Thereby, it may be possible to further improve convenience in manufacturing the storage device 1.

It may be hard to predict (e.g., hard to control) which part of the board 11 is bent (e.g., which part of the board is cut) depending on the shape of the hole in the weak portion 91. Depending on the cutting position of the board 11, a comparatively large unnecessary portion of the board 11 may remain after cutting of the board 11. In this case, it is necessary to remove the unnecessary portion by grinding or the like.

According to the present modification, the plurality of holes 93, 111, and 112 of the first weak portion 91A include the first hole 111 and the second hole 112, for example. The second hole 112 is smaller than the first hole 111. Also, the fourth edge 112b is closer to the second receiver 22B than the second edge 111b is. When cutting the board 11 according to such a configuration, it may be easy to control the cutting position of the board 11, since the board 11 may be bent along a line which connects the first hole 111 and the second hole 112. For this reason, the unnecessary portion of the board 11 is less likely to remain after cutting of the board 11. Thereby, it may be possible to reduce work of grinding or the like after cutting the board 11. Thereby, it may be possible to further improve convenience in manufacturing the storage device 1.

In the present modification, the ground pattern 24 includes the second portion 62 and the connection portion 65. The second portion is between the first weak portion 91A and the terminal portion 21. The connection portion 65 connects the first portion 61 and the second portion 62 through one of the areas between the plurality of holes 93, 111, and 112 of the first weak portion 91A. According to such a configuration, the first portion 61 and the second portion 62 of the ground pattern 24 are easily electrically connected in the board 11 in which the first weak portion 91A including the plurality of holes 93, 111, and 112 is provided.

(Second Modification)

Figure 14:
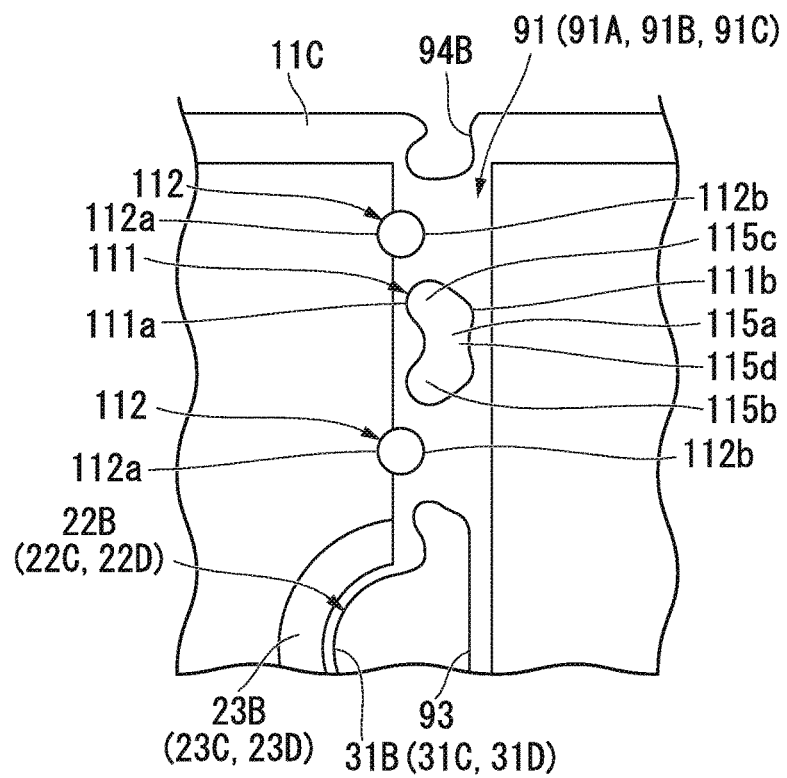
FIG. 14 is an enlarged plan view of the storage device according to a second modification of the second embodiment.

FIG. 14 shows the weak portion 91 of a storage device 1 according to a second modification. The elements except for those described below are the same as those of the first modification.

As shown in FIG. 14, in the present modification, the third edge 112a of the second hole 112 is located further in +X direction than the first edge 111a of the first hole 111. From another viewpoint, the third edge 112a is closer to the terminal portion 21 than the first edge 111a is.

According to such a configuration, it may be possible to further reduce the unnecessary portion of the board 11 that remains after cutting of the board 11. Thereby, it may be possible reduce the work of grinding or the like after cutting of the board 11. Thereby, it may be possible to further improve the convenience in manufacturing the storage device 1.

In the above, the first and the second embodiments and those modifications are described. However, the configuration of the embodiments is not limited to the above-described example. For example, as described above, the electronic apparatus to which the storage device 1 is attached may be a server.

Figure 15:
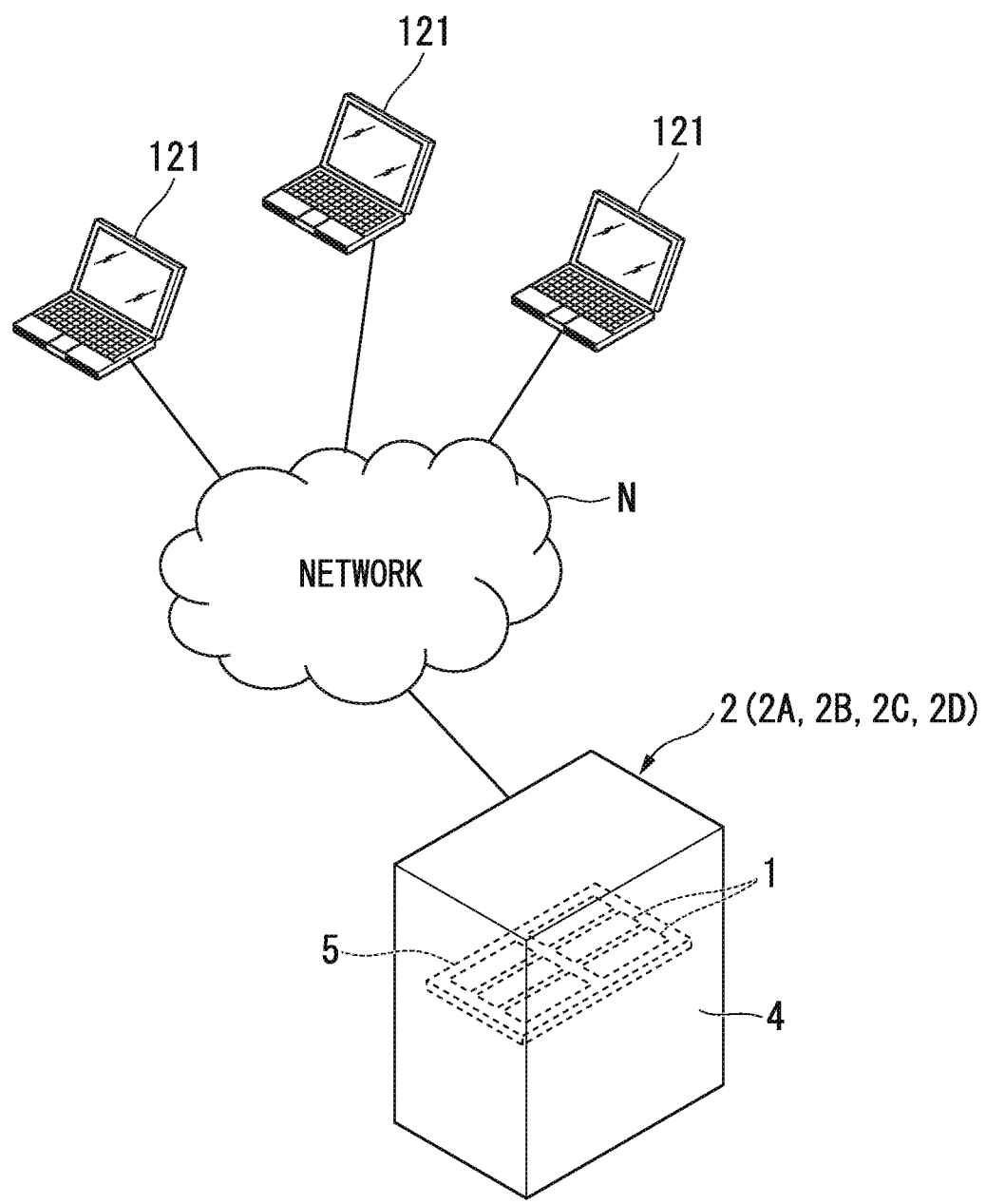
FIG. 15 illustrates another example of an electronic apparatus to which the storage device according to the first and second embodiments is applicable.

FIG. 15 shows the electronic apparatus 2 used as a server. As shown in FIG. 15, the electronic apparatus 2 is a host computer, for example. The electronic apparatus 2 is connected to a plurality of electronic apparatuses (e.g., client computer) 121 through the network N. The electronic apparatus 2 includes the case 4 and the circuit board 5 accommodated in the case 4. The circuit board 5 includes the connector 6 to which the storage device 1 is attached, and the fixation structure 7 which fixes the storage device 1, in a manner similar to the one according to the first embodiment.

According to at least one embodiment, a storage device includes a board and memory circuitry. The board includes a terminal, a first receiver, and a second receiver. The terminal is connectable to a connector of an external apparatus. The first receiver is on a first side of the board or a position closer to the first side than a center of the board. The first receiver is configured to receive a fastener. The second receiver is between the terminal and the first receiver. The second receiver is for the fastener. The memory circuitry is between the terminal and the second receiver. According to such a configuration, one storage device is able to correspond to two or more standard lengths included in the predetermined standard.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A storage device, comprising:
 a base board including
  on a first edge, a connector that is connectable to a host device and through which the storage device communicates with the host device,
  on a second edge that is opposite to the first edge, a first engaging portion by which the base board is fixable to the host device, and
  in an intermediate portion that is located between the first edge and the second edge, a second engaging portion by which the base board is fixable to the host device when an end portion of the base board between the second edge and the intermediate portion is removed; and
 a memory chip package disposed on a surface of the base board and between the first edge and the intermediate portion.

2. The storage device according to claim 1, wherein
the base board includes a ground layer therein, and
each of the first and second engaging portions has a terminal that is electrically connected to the ground layer.

3. The storage device according to claim 2, wherein
a coverage of the ground layer in the base board is greater than a coverage of the terminals in the base board.

4. The storage device according to claim 1, wherein
the first engaging portion includes a semicircular recess, and
the second engaging portion includes a semicircular hole formed so as to become a semicircular recess when the portion of the base board is removed.

5. The storage device according to claim 1, wherein
each of the first and second engaging portions includes a circular hole.

6. The storage device according to claim 1, wherein
the base board further includes a fragile portion that is positioned between the intermediate portion and the end portion and extends in a direction parallel to the second edge.

7. The storage device according to claim 6, wherein
the fragile portion includes a recess or hole that extends in the direction parallel to the second edge.

8. The storage device according to claim 6, wherein
the fragile portion includes a plurality of holes arranged along the direction parallel to the second edge.

9. The storage device according to claim 1, wherein
the base board further includes, in a second intermediate portion that is located between the first edge and the intermediate portion, a third engaging portion by which the base board is fixable to the host device when an end portion of the base board between the second edge and the second intermediate portion is removed, and
the memory chip package is disposed between the first edge and the second intermediate portion.

10. The storage device according to claim 9, wherein
the base board further includes a second fragile portion that is positioned between the second intermediate portion and the intermediate portion and extends in a direction parallel to the second edge.

11. A computing device, comprising:
a circuit board having a receptor; and
a storage device disposed on the circuit board, the storage device including:
  a base board including
    on a first edge, a connector that is connected to the receptor and through which the storage device communicates with the circuit board,
    on a second edge that is opposite to the first edge, an engaging portion that is fixed to the circuit board, and
    in an intermediate portion that is located between the first edge and the second edge, a remnant engaging portion that is not fixed to the circuit board and structured substantially similarly to the engaging portion; and
  a memory chip package disposed on a surface of the base board and between the first edge and the intermediate portion.

12. The computing device according to claim 11, wherein
the base board includes a ground layer therein, and
each of the engaging portion and the remnant engaging portion has a terminal that is electrically connected to the ground layer.

13. The computing device according to claim 12, wherein
a coverage of the ground layer in the base board is greater than a coverage of the terminals in the base board.

14. The computing device according to claim 11, wherein
the engaging portion includes a semicircular recess, and
the remnant engaging portion includes a semicircular hole.

15. The computing device according to claim 11, wherein
the base board further includes a fragile portion that is positioned between the intermediate portion and the end portion and extends in a direction parallel to the second edge.

16. A method for connecting a storage device to a host device thereof, the storage device having:
a base board including
  on a first edge, a connector that is connectable to a host device and through which the storage device communicates with the host device,
  on a second edge that is opposite to the first edge, a first engaging portion, and
  in an intermediate portion that is located between the first edge and the second edge, a second engaging portion; and
a memory chip package disposed on a surface of the base board and between the first edge and the intermediate portion, the method comprising:
removing an end portion of the base board between the second edge and the intermediate portion, such that the second engaging portion is located on a removed edge of the base board;
connecting the base board from which the end portion has been removed, to a receptor of the host device that is disposed on a circuit board, such that the storage device can communicate with the host device; and
fixing the base board to the circuit board through the second engaging portion.

17. The method according to claim 16, wherein
the base board is fixed to the circuit board at the second engaging portion using a fixing member.

18. The method according to claim 17, wherein
the fixing member is formed of an electrically-conductive material, and the base board at the second engaging portion is electrically connected to ground by being fixed by the fixing member.

19. The method according to claim 16, wherein
the base board further includes a fragile portion that is positioned between the intermediate portion and the end portion and extends in a direction parallel to the second edge, and
the end portion is removed by dividing the base board along the fragile portion.

20. The method according to claim 19, wherein
the fragile portion includes a recess or hole that extends in the direction parallel to the second edge.

* * * * *